United States Patent
Usui

(10) Patent No.: US 8,817,494 B2
(45) Date of Patent: Aug. 26, 2014

(54) PFC AC/DC CONVERTER REDUCING HARMONICS, SWITCHING LOSS, AND SWITCHING NOISE

(75) Inventor: Hiroshi Usui, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 450 days.

(21) Appl. No.: 13/195,418

(22) Filed: Aug. 1, 2011

(65) Prior Publication Data

US 2012/0033451 A1    Feb. 9, 2012

(30) Foreign Application Priority Data

Aug. 9, 2010   (JP) ................................ 2010-178846
Aug. 9, 2010   (JP) ................................ 2010-178851

(51) Int. Cl.
  *H02M 3/335*   (2006.01)
  *H02M 1/42*    (2007.01)
  *H02M 1/00*    (2006.01)

(52) U.S. Cl.
  CPC .... H02M 1/4258 (2013.01); *H02M 2001/0048* (2013.01); *Y02B 70/1491* (2013.01); H02M 3/33569 (2013.01); *Y02B 70/126* (2013.01)
  USPC .......................................... 363/21.02; 363/89

(58) Field of Classification Search
  USPC .......... 363/20, 21.01, 21.02, 21.04, 21.12, 89
  See application file for complete search history.

(56) References Cited

U.S. PATENT DOCUMENTS

| | | | | |
|---|---|---|---|---|
| 8,547,028 B2 * | 10/2013 | Ohtake | ...................... | 315/200 R |
| 2006/0098464 A1 * | 5/2006 | Osaka et al. | ............... | 363/21.01 |
| 2006/0158908 A1 * | 7/2006 | Usui | ................................ | 363/15 |
| 2007/0008757 A1 * | 1/2007 | Usui et al. | ...................... | 363/125 |
| 2007/0274105 A1 * | 11/2007 | Osaka | ......................... | 363/21.02 |
| 2009/0251925 A1 * | 10/2009 | Usui et al. | ........................ | 363/16 |
| 2010/0265741 A1 * | 10/2010 | Usui | .......................... | 363/21.12 |
| 2010/0302817 A1 * | 12/2010 | Usui | .......................... | 363/21.17 |
| 2011/0007529 A1 * | 1/2011 | Usui | .......................... | 363/21.12 |
| 2011/0051465 A1 * | 3/2011 | Usui | .......................... | 363/21.02 |
| 2012/0033451 A1 * | 2/2012 | Usui | .......................... | 363/21.02 |
| 2013/0016534 A1 * | 1/2013 | Ishikura et al. | ............ | 363/21.02 |
| 2013/0294114 A1 * | 11/2013 | Nakanishi | .................. | 363/21.01 |
| 2013/0301305 A1 * | 11/2013 | Orr et al. | .................... | 363/21.02 |

FOREIGN PATENT DOCUMENTS

JP       2005-287257       10/2005

* cited by examiner

*Primary Examiner* — Jeffrey Sterrett
(74) *Attorney, Agent, or Firm* — Oblon, Spivak, McClelland, Maier & Neustadt, L.L.P.

(57) ABSTRACT

A converter includes a rectifying circuit of an AC voltage of an AC power source into a rectified voltage, an input smoothing capacitor Ci, a first series circuit connected to the input smoothing capacitor and including a first and a second switching elements, a second series circuit connected to a connection point of the first and second switching elements and a first end of the input smoothing capacitor and including a primary winding of a transformer and a first capacitor Cri, a controller to alternately turn on/off the first and second switching elements, a rectifying-smoothing circuit (D1, Co) to rectify and smooth a high-frequency voltage of a secondary winding of the transformer into a DC output voltage, and a second capacitor connected between a connection point of the primary winding of the transformer and the first capacitor and a first end of the AC power source.

6 Claims, 32 Drawing Sheets

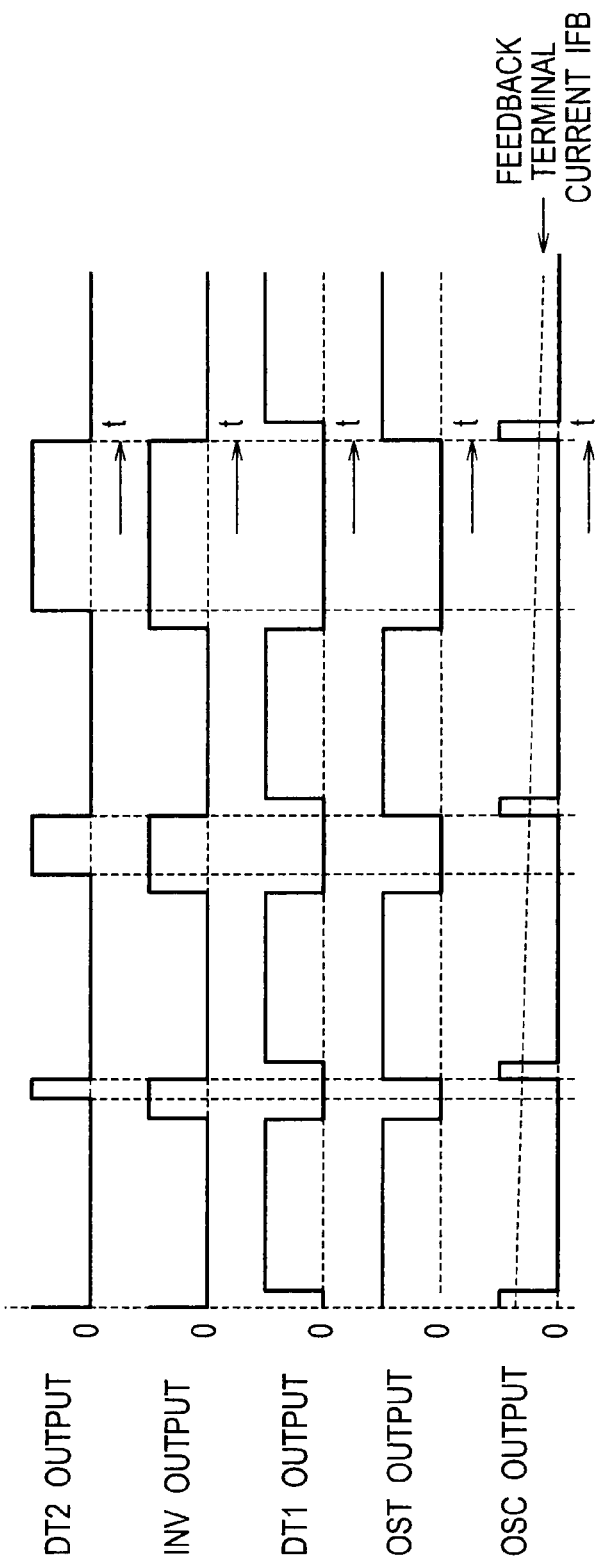

PFC AC/DC CONVERTER REDUCING HARMONICS, SWITCHING LOSS, AND SWITCHING NOISE

BACKGROUND OF THE INVENTION

1. Field of the Invention

The prevent invention relates to a converter having a power factor correcting function.

2. Description of Related Art

FIG. 1 is a circuit diagram illustrating a converter according to a related art. In FIG. 1, the converter includes a PFC (power factor correction) part A to correct a power factor and a DC-DC converter part B that employs a transformer to realize electric insulation and convert a voltage into another voltage. The PFC part A rectifies an AC voltage supplied from an AC power source AC, carries out ON/OFF control of a switching element Qp with a step-up chopper so that an input current may have the same waveform as an input voltage, and controls an output voltage Vp of the PFC part A to a constant value. The DC-DC converter part B converts, in an insulated manner, the output voltage Vp from the PFC part A into an optional output voltage Vo. The DC-DC converter part B is, for example, a half-wave-rectifying current resonance converter.

Operation of the converter of FIG. 1 will be explained. A sinusoidal voltage from the AC power source AC is rectified by a bridge rectifier DB through a filter circuit FL, to provide the step-up chopper with a full-wave-rectified waveform. The step-up chopper includes a winding N1 of a reactor L1 having a transformer configuration, the switching element Qp of a MOSFET, and a rectifying diode Dp.

First, a flip-flop FF is set, a gate waveform (signal) illustrated in FIG. 2 is applied to a gate of the switching element Qp to turn on the switching element Qp, and a current passes clockwise through a path extending along AC, FL, DE, N1 of L1, Qp, R5, DB, FL, and AC, to accumulate energy in the reactor L1. A switching current passing through the switching element Qp is detected by the resistor R5 for detecting switching current as a voltage VR5 illustrated in FIG. 2 and is compared by a comparator COMP2 with a target value VM.

If the switching current reaches the target value VM, the flip-flop FF is reset to turn off the switching element Qp. When the switching element Qp is turned off, a combination of the energy accumulated in the reactor L1 and the voltage supplied from the AC power source AC charges through the rectifying diode Dp an output capacitor Ci of the PFC part A. The voltage supplied to the output capacitor Ci of the PFC part A is higher than a peak value of the supplied sinusoidal voltage. The voltage Vp of the output capacitor Ci of the PFC part A is detected by resistors R6 and R7 and is compared by an operational amplifier OTA with a second reference voltage ES2. An error signal between the voltage Vp detected through the resistors R6 and R7 and the second reference voltage ES2 is supplied from the operational amplifier OTA to a multiplier MUL. The multiplier MUL multiplies the full-wave-rectified waveform detected through resistors R1 and R2 by the error signal and supplies a result of the multiplication to the comparator COMP2 as the switching current target value VM.

After the reactor L1 discharges the energy, a voltage VN2 of a criticality detecting winding N2 is inverted as illustrated in FIG. 2. A comparator COMP1 compares the voltage VN2 with a first reference voltage ES1 and sets the flip-flop FE. This again turns on the switching element Qp. Thereafter, the above-mentioned operation is repeated to generate a control signal for the switching element Qp so that the voltage Vp of the output capacitor Ci of the PFC part A may keep a constant value and so that an input current may have a sinusoidal waveform that follows an input voltage waveform. The voltage Vp of the output capacitor Ci of the PFC part A serves as a DC power source for the DC-DC converter part B.

FIG. 3 illustrates an example of a controller 1 arranged in the DC-DC converter part B and FIG. 4 illustrates waveforms at various locations of the controller 1. Operation of the controller 1 will be explained.

In FIG. 3, an oscillator OSC outputs a pulse (OSC output in FIG. 4) to a one-shot circuit OST of a one shot multivibrator. Based on the pulse from the oscillator OSC, the one-shot circuit OST outputs a pulse (OST output in FIG. 4) having a predetermined pulse width to a dead time generator DT1. When the pulse rises, a dead time is added (DT1 output in FIG. 4).

At the same time, the output of the one-shot circuit OST is inverted by an inverter INV and the inverted output (INV output in FIG. 4) is supplied to a dead time generator DT2. The output of the dead time generator DT1 is supplied to a buffer BUF1, which provides a drive signal LD to drive a low-side switching element Q1. An output (DT2 output in FIG. 4) from the dead time generator DT2 is changed by a level shifter LES into a signal having a different potential level and the level shifted signal is given to a buffer BUF2. The buffer BUF2 outputs a drive signal HD to drive a high-side switching element Q2. The oscillation frequency of the oscillator OSC is controlled according to a current provided by a feedback terminal FB. As the feedback terminal current IFB increases, the oscillation frequency increases.

The switching elements Q1 and Q2 each are made of a MOSFET, each have a given dead time, and are alternately turned on/off. FIGS. 5A and 5B illustrate waveforms in the DC-DC converter part B.

When the switching element Q2 turns on, a current IQ2 passes clockwise through a path extending along C1, Q2, Lr, P, Cri, and Ci. At this time, the waveform of the current IQ2 is mostly determined by a resonance frequency of the current resonance capacitor Cri and "Lr+Lp". Here, Lp is an inductance of the primary winding P of a transformer Ta. The resonance frequency at this time is sufficiently lower than the switching frequency of the switching element Q2 and a sinusoidal wave is partly observed as a triangular wave (refer to IQ2 in FIG. 5A). The current IQ2 serves as an excitation current for the primary winding P of the transformer Ta.

When the switching element Q2 is turned off while the current IQ2 is passing, a voltage across the switching elements Q1 and Q2 has a quasi-voltage-resonance waveform based on a resultant value of the voltage resonance capacitor Crv and current resonance capacitor Cri and a resultant value of the inductance Lp of the primary winding P of the transformer Ta and the leakage inductance Lr. According to a relationship of Crv<<Cri, a resonance frequency at this time is mostly determined by the voltage resonance capacitor Crv.

The excitation current for the primary winding P passing through the switching element Q2 is translocated to a parasitic diode of the switching element Q1. After a voltage VQ1 across the switching element Q1 reaches zero, the switching element Q1 is turned on, to realize zero-voltage switching. Thereafter, a current IQ1 translocated to the switching element Q1 decreases, inverts its polarity, and passes through a MOSFET part of the switching element Q1. As a result, the current IQ1 passes counterclockwise through a path extending along Cri, P, Lr, Q1, and Cri. A current waveform at this time is of a resultant current of a resonance current created by the current resonance capacitor Cri having a highest resonance frequency and leakage inductance Lr and the excitation current for the primary winding P of the transformer Ta. The resonance current is provided, through a secondary winding S1 of the transformer Ta and an output rectifying diode D1, to an output capacitor Co and a load. When the resonance current passing through the secondary side becomes zero to leave only the excitation current, the switching element Q1 is turned off.

When the switching element Q1 is turned off, a voltage across the switching elements Q1 and Q2 has a quasi-voltage-resonance waveform based on a resultant value of the voltage resonance capacitor Crv and current resonance capacitor Cri and a resultant value of the inductance Lp of the primary winding P of the transformer Ta and the leakage inductance Lr. According to the relationship of Crv<<Cri, a resonance frequency at this time is also mostly determined by the voltage resonance capacitor Crv. The excitation current for the primary winding P passing through the switching element Q1 is translocated to a parasitic diode of the switching element Q2. After the voltage VQ2 across the switching element Q2 becomes zero, the switching element Q2 is turned on, to realize zero-voltage switching. Thereafter, the current IQ2 translocated to the switching element Q2 decreases, inverts its polarity, and passes through a MOSFET part of the switching element Q2. Thereafter, the above-mentioned operation is repeated.

The switching elements Q1 and Q2 each have a dead time and are alternately turned on/off. The switching element Q1 turns on with an ON width that may zero an ON-time resonance current, thereby substantially realizing zero-current switching. Namely, the ON time of the switching element Q1 is fixed and the ON time of the switching element Q2 is variable in order to adjust a charging voltage of the current resonance capacitor Cri and control the output voltage Vo.

The controller 1 illustrated in FIG. 3 is a PWM controller with the ON width of the low-side switching element Q1 being fixed and that of the high-side switching element Q2 being variable. On the other hand, a controller 1 illustrated in FIG. 6 is a PWM controller employing a fixed frequency. The frequency-fixed PWM controller of FIG. 6 employs a constant switching frequency and controls an ON/OFF ratio of the low- and high-side switching elements. In FIG. 6, the frequency-fixed PWM controller includes an oscillator PWOSC, an inverter INV, dead time generators DT1, and DT2, a level shifter LES, and buffers BUF1 and BUF2. If the ON width and resonance period of the low-side switching element are kept within proper ranges, the controller of FIG. 6 is usable like the controller of FIG. 3. The PWM controller of FIG. 6 is inexpensive. FIG. 7 illustrates waveforms at various locations of the PWM controller of FIG. 6. An example of this sort of frequency-fixed PWM controller is disclosed in Japanese Unexamined Patent Application Publication No. 2005-287257.

There are regulations and standards to restrict harmonic currents passing through commercial AC power source lines. For example, there is an international standard IEC61000-3-2. To minimize harmonic currents, an important factor is to bring an input current waveform closer to a sinusoidal wave. Generally, harmonic currents decrease if an input power factor is corrected. To correct the input power factor, the converter of the related art illustrated in FIG. 1 arranges the active filter circuit in front of the DC-DC converter part B. The active filter circuit is based on the step-up chopper to step up a lower voltage portion of a sinusoidal AC voltage and continuously pass an input current.

SUMMARY OF THE INVENTION

The converter according to the related art illustrated in FIG. 1, however, involves a large number of parts and carries out a switching operation in each of the PFC part A and DC-DC converter part B. This results in increasing a switching loss, switching noise, and the like.

The present invention provides a converter having a power factor correcting function, capable of reducing harmonic currents, switching loss, and switching noise at low cost.

According to a first aspect of the present invention, the converter includes a rectifying circuit configured to rectify an AC voltage supplied from an AC power source into a rectified voltage, an input smoothing capacitor configured to smooth the rectified voltage, a first series circuit connected to both ends of the input smoothing capacitor and including a first switching element and a second switching element, a second series circuit connected to a connection point of the first and second switching elements and a first end of the input smoothing capacitor and including a primary winding of a transformer and a first capacitor, a controller configured to alternately turn on/off the first and second switching elements, a rectifying-smoothing circuit configured to rectify and smooth a high-frequency voltage generated at a secondary winding of the transformer into a DC output voltage, and a second capacitor connected between a connection point of the primary winding of the transformer and the first capacitor and a first end of the AC power source.

According to a second aspect of the present invention, the converter includes a rectifying circuit configured to rectify an AC voltage supplied from an AC power source into a rectified voltage, an input smoothing capacitor configured to smooth the rectified voltage, a rectifier connected between the rectifying circuit and the input smoothing capacitor, a first series circuit connected to both ends of the input smoothing capacitor and including a first switching element and a second switching element, a second series circuit connected to a connection point of the first and second switching elements and a first end of the input smoothing capacitor and including a primary winding of a transformer and a first capacitor, a controller configured to alternately turn on/off the first and second switching elements, a rectifying-smoothing circuit configured to rectify and smooth a high-frequency voltage generated at a secondary winding of the transformer into a DC output voltage, and a second capacitor connected between a connection point of the primary winding of the transformer and the first capacitor and a connection point of the rectifying circuit and rectifier.

According to a third aspect of the present invention, the converter includes a rectifying circuit configured to rectify an AC voltage supplied from an AC power source into a rectified voltage, an input smoothing capacitor configured to smooth the rectified voltage, a reactor connected to one selected from a section between an output end of the rectifying circuit and the input smoothing capacitor and a section between the AC power source and the rectifying circuit, a first series circuit connected to both ends of the input smoothing capacitor and including a first switching element and a second switching element, a second series circuit connected to a connection point of the first and second switching elements and a first end of the input smoothing capacitor and including a primary winding of a transformer and a first capacitor, a controller configured to alternately turn on/off the first and second switching elements, a rectifying-smoothing circuit configured to rectify and smooth a high-frequency voltage generated at a secondary winding of the transformer into a DC output voltage, and a second capacitor connected between a connection point of the primary winding of the transformer and the first capacitor and a first end of the AC power source.

According to a fourth aspect of the present invention, the converter includes a rectifying circuit configured to rectify an AC voltage supplied from an AC power source into a rectified voltage, an input smoothing capacitor configured to smooth the rectified voltage, a first series circuit connected to both ends of the input smoothing capacitor and including a first switching element and a second switching element, a second series circuit connected to a connection point of the first and second switching elements and a first end of the input smoothing capacitor and including a primary winding of a transformer and a first capacitor, a controller configured to alternately turn on/off the first and second switching elements, a rectifying-smoothing circuit configured to rectify and smooth a high-frequency voltage generated at a secondary winding of the transformer into a DC output voltage, and a third series circuit connected between a connection point of the primary winding of the transformer and the first capacitor and a first end of the AC power source and including a second capacitor and a reactor.

BRIEF DESCRIPTION OF THE DRAWINGS

FIG. 4 is a view illustrating waveforms at different locations of the controller of FIG. 3;

FIGS. 5A and 5B are views illustrating waveforms at different locations of the converter of FIG. 1, in which FIG. 5A is with a high input voltage and FIG. 5B is with a low input voltage;

DESCRIPTION OF PREFERRED EMBODIMENTS

Converters according to embodiments of the present invention will be explained in detail with reference to the drawings.
Embodiment 1

Figure 8:
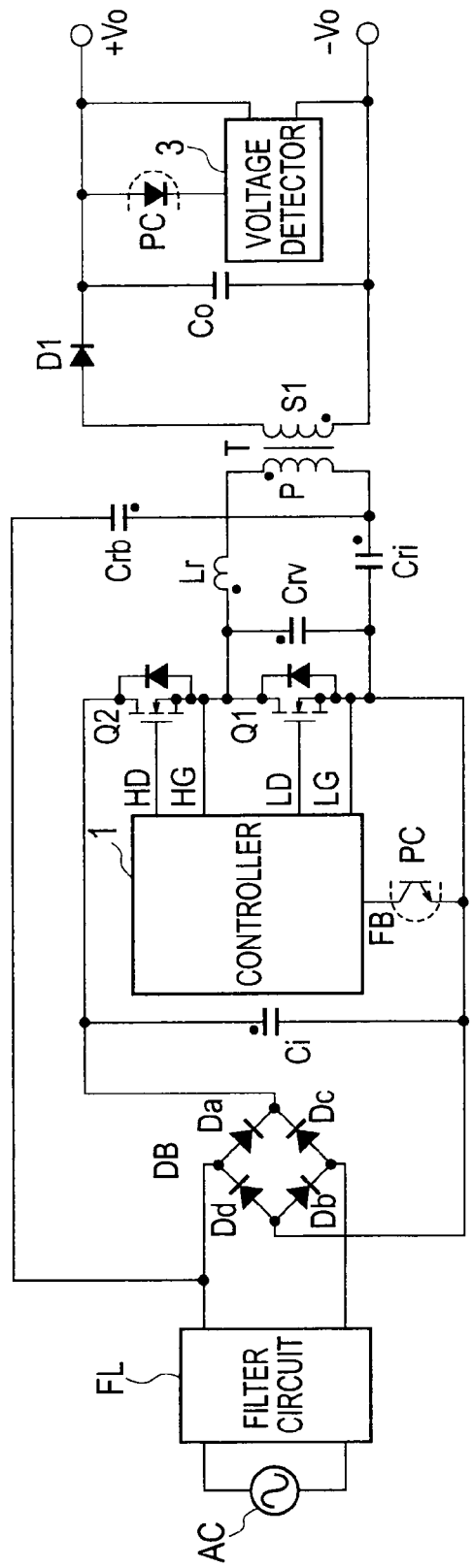
FIG. 8 is a circuit diagram illustrating a converter according to Embodiment 1 of the present invention.

FIG. 8 is a circuit diagram illustrating a converter according to Embodiment 1 of the present invention. In FIG. 8, an AC power source AC supplies an AC voltage through a filter circuit FL to a bridge rectifier DB. Both output ends of the bridge rectifier DB are connected to an input smoothing capacitor Ci and a series circuit including switching elements Q1 and Q2 each being a MOSFET.

Connected between the drain and source of the switching elements Q1 are a voltage resonance capacitor Crv and a series circuit including a primary winding P of a transformer T and a current resonance capacitor Cri. Lr is a leakage inductance appearing between the primary winding P and a secondary winding S1 of the transformer T. The leakage inductance Lr may be a discrete reactor.

A connection point of the primary winding P of the transformer T and the current resonance capacitor. Cri is connected to a first end of a feedback capacitor Crb. A second end of the feedback capacitor Crb is connected to a connection point of the bridge rectifier DB and filter circuit FL. This is equivalent to that the feedback capacitor Crb is connected to a first end of the AC power source AC through the filter circuit FL.

The secondary winding S1 of the transformer T is connected to a series circuit including a rectifying diode D1 and a smoothing capacitor Co. The smoothing capacitor Co is connected to output terminals +Vo and −Vo and a voltage detector 3. The voltage detector 3 is connected to a photodiode of a photocoupler PC. The voltage detector 3 detects an output voltage of the smoothing capacitor Co and outputs the detected voltage as a feedback signal through the photodiode and phototransistor of the photocoupler PC to a feedback terminal FB of a controller 1.

Based on the feedback signal to the feedback terminal FB, the controller 1 carries out PWM control to alternately turn on/off the switching elements Q1 and Q2. Instead, the controller 1 may fix the ON period of one of the switching elements Q1 and Q2 and vary the ON period of the other.

Figure 1:
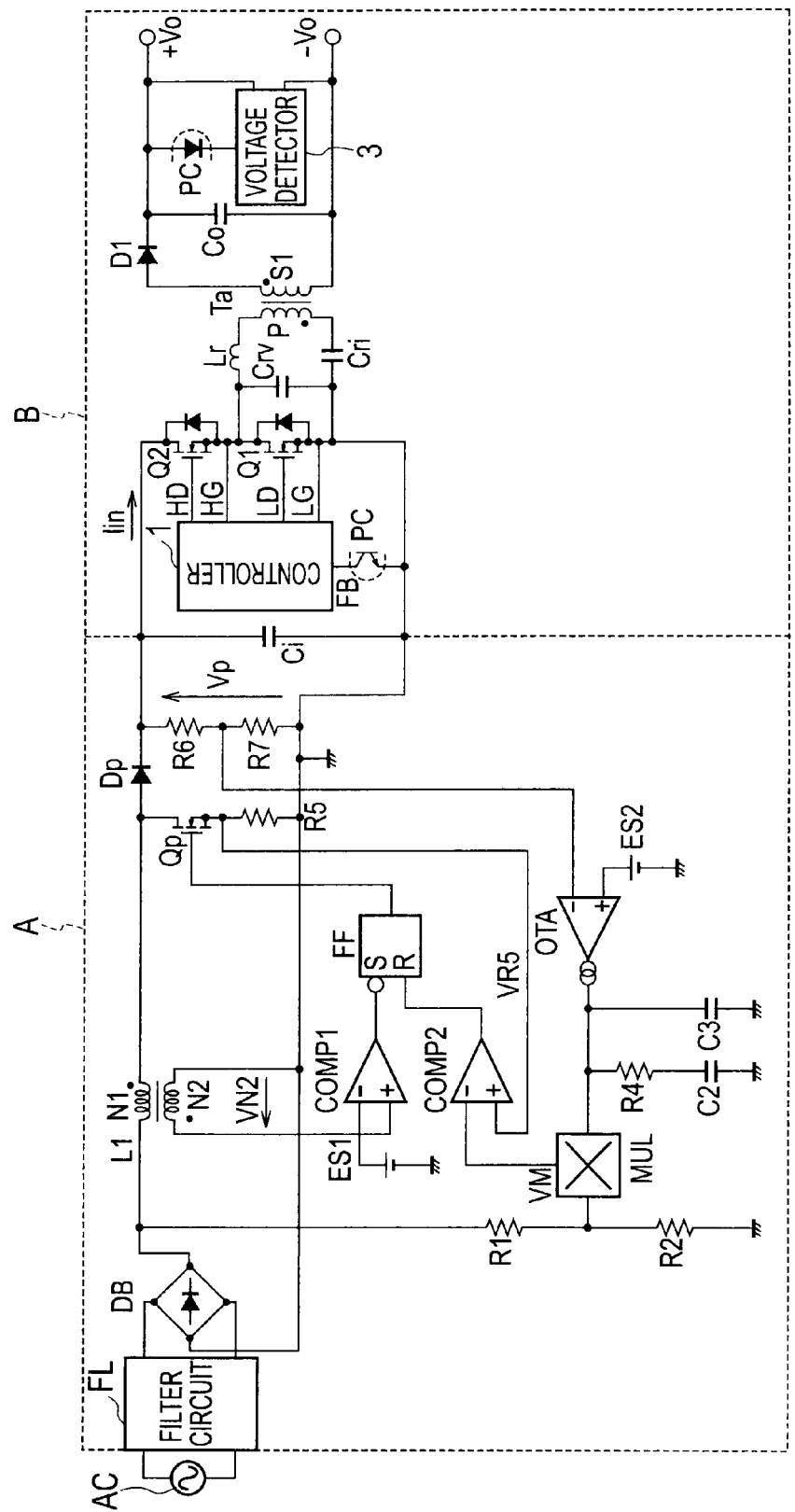
FIG. 1 is a circuit diagram illustrating a converter according to a related art.
Figure 2:
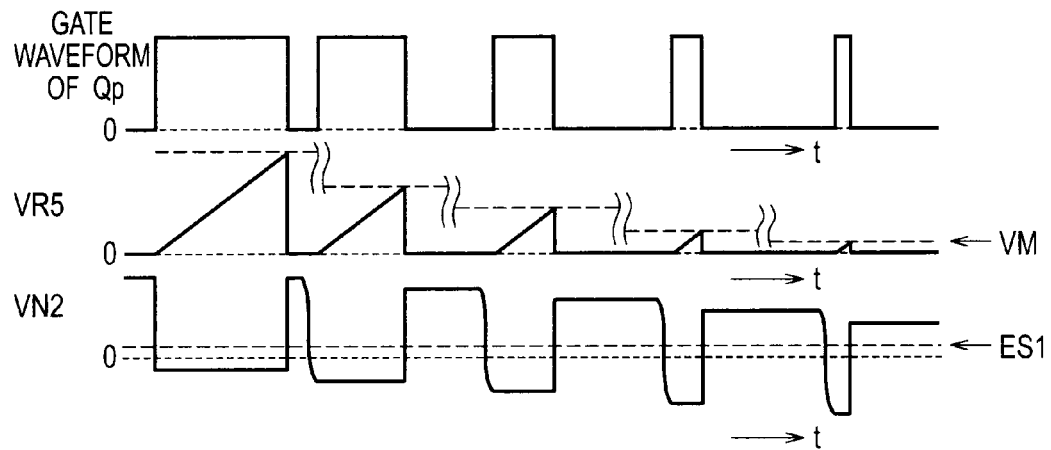
FIG. 2 is a view illustrating waveforms at different locations of the converter of FIG. 1.
Figure 3:
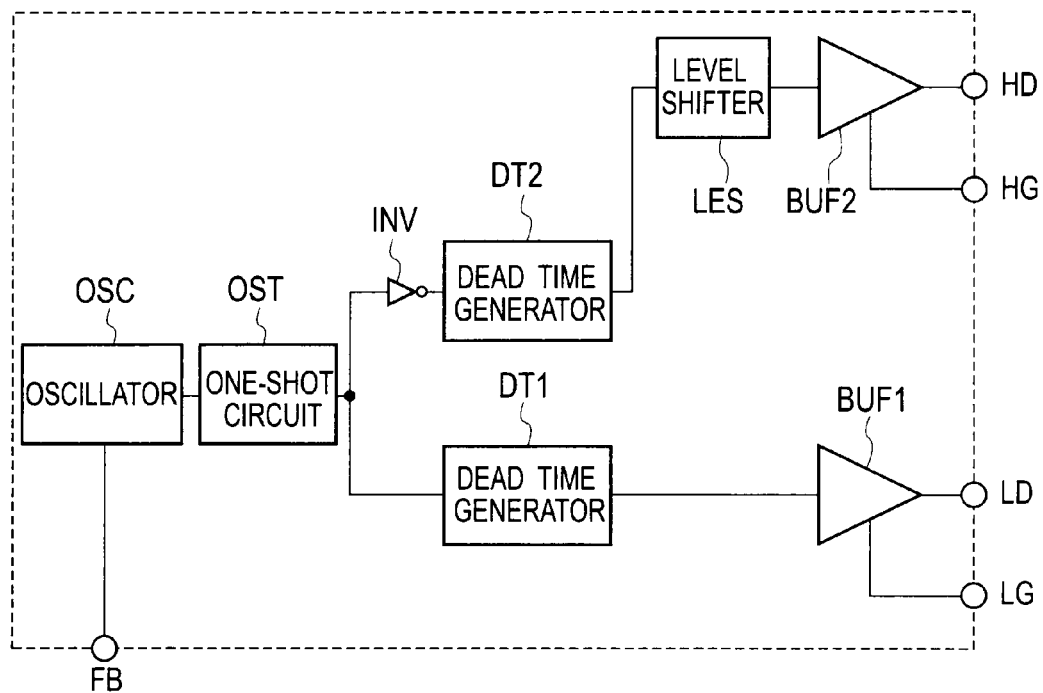
FIG. 3 is a circuit diagram illustrating an example of a controller arranged in the converter of FIG. 1.
Figure 5A:
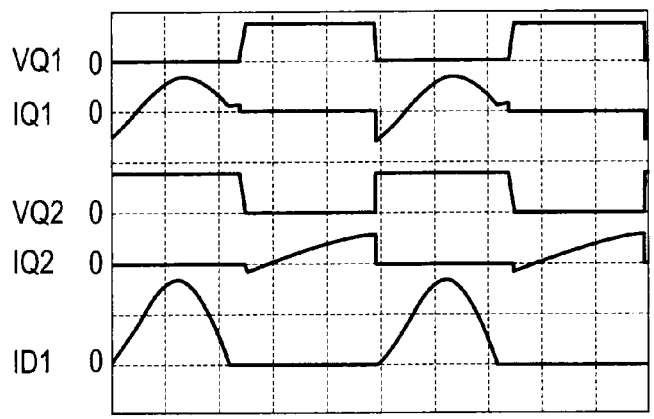
Figure 5B:
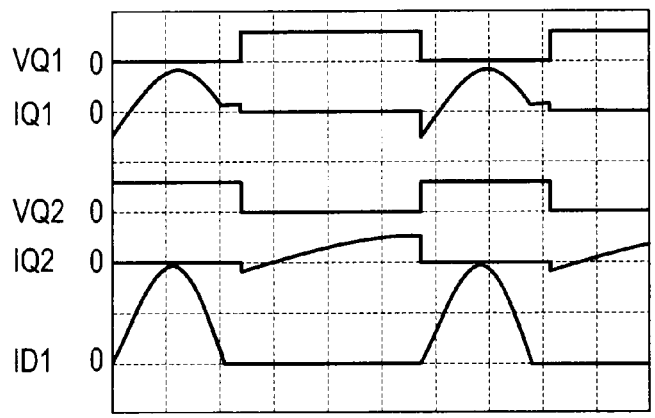
Figure 6:
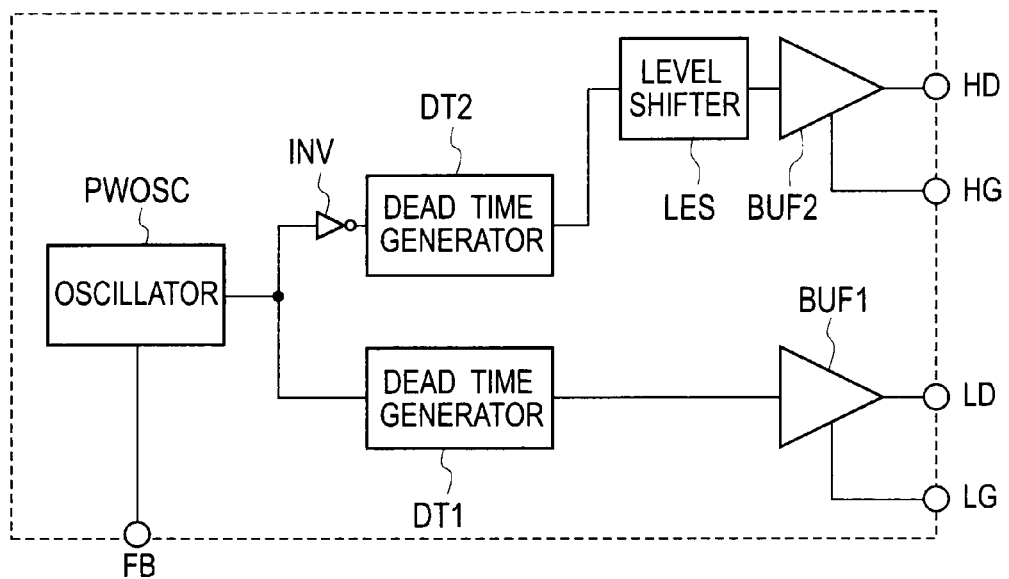
FIG. 6 is a circuit diagram illustrating another example of the controller arranged in the converter of FIG. 1.
Figure 7:
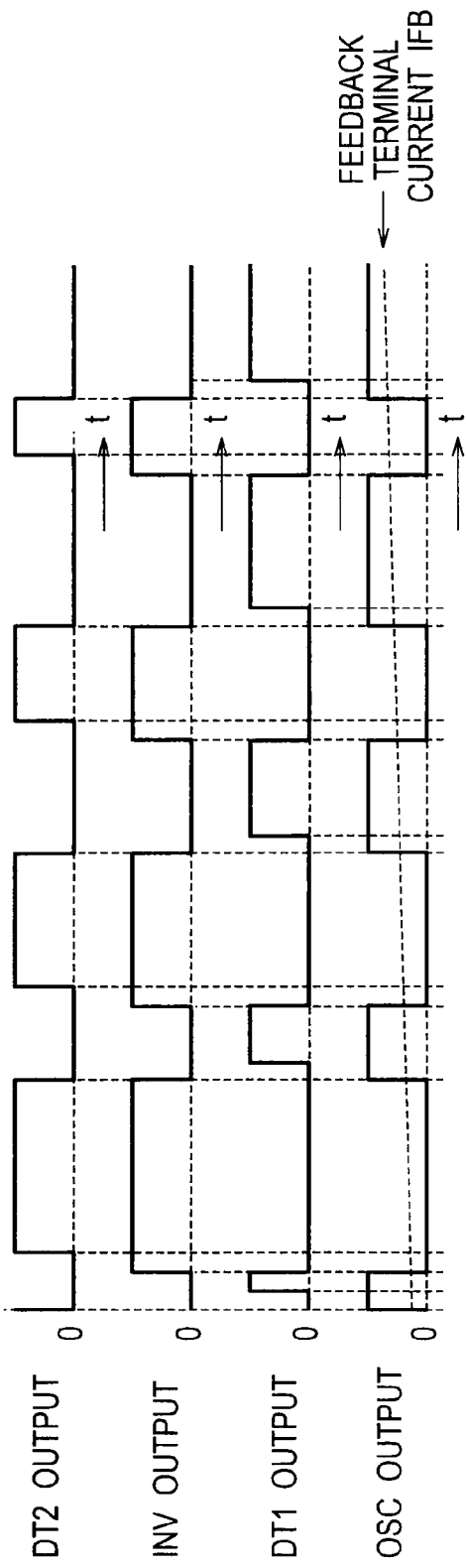
FIG. 7 is a view illustrating waveforms at different locations of the controller of FIG. 6.

Compared with the converter of the related art illustrated in FIG. 1, the converter of the present embodiment illustrated in FIG. 8 is characterized in that Embodiment 1 omits the step-up chopper in the PFC part A of FIG. 1 and newly employs the feedback capacitor Crb.

The converter according to the present embodiment is basically a half-wave-rectifying current resonance converter.

Operation of the converter according to the present embodiment will be explained with reference to FIG. 9 that illustrates waveforms at different locations of the converter of FIG. 8 when an upper end of the AC power source AC is positive. Operation of each period will be explained by dividing the period into sub-periods T1 to T7. The feedback capacitor Crb is charged so that a terminal thereof connected to the bridge rectifier DB and filter circuit FL is negative.

In the following explanation, explanation about a current of the secondary side of the transformer T that passes in the same timing manner of the related art is omitted. Also omitted is explanation about the current and quasi-voltage-resonance operation of the voltage resonance capacitor Crv.

Figure 9:
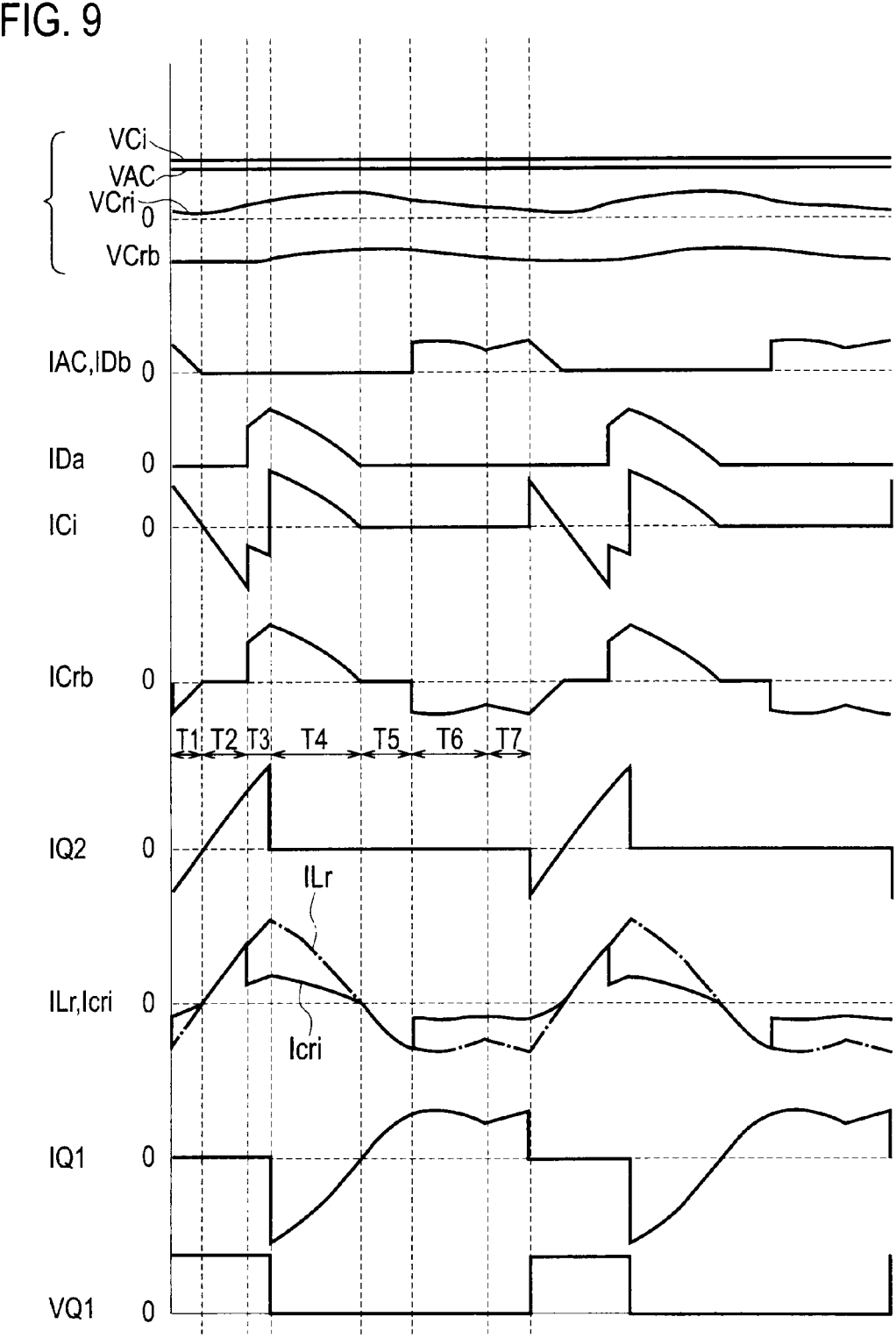
FIG. 9 is a view illustrating waveforms at different locations of the converter of FIG. 8 when an upper end of an AC power source AC of FIG. 8 is positive.

In FIG. 9, VAC represents a voltage across the AC power source AC, VCi a voltage across the input smoothing capacitor Ci, VCri a voltage across the current resonance capacitor Cri, VCrb a voltage across the feedback capacitor Crb, IAC a current passing through the AC power source AC, IDb a current of a diode Db, IDa a current of a diode Da, ICi a current of the input smoothing capacitor Ci, ICrb a current of the feedback capacitor Crb, IQ2 a current of the drain of the switching element Q2, ILr a current of the leakage inductance Lr, Icri a current of the current resonance capacitor Cri, IQ1 a current of the drain of the switching element Q1, and VQ1 is a drain-source voltage of the switching element Q1.

In sub-period T1, the switching element Q1 is OFF and the switching element Q2 is ON. At this time, there are a first current path extending along AC, FL, Crb, P, Lr, Q2, Ci, Db, FL, and AC and a second current path extending along Cri, P, Lr, Q2, Ci, and Cri. Through the respective impedance elements, the currents ICrb, ILr, IQ2, ICi, IDb, and Icri pass. As results, the AC power source AC charges the input smoothing capacitor Ci, to charge the feedback capacitor Crb and discharge the current resonance capacitor Cri.

In sub-period T2, the same state continues that the switching element Q1 is OFF and the switching element Q2 is ON. At this time, the currents ILr, IQ2, ICi, and Icri pass clockwise through a path extending along C1, Q2, Lr, P, Cri, and Ci, to discharge the input smoothing capacitor Ci and charge the current resonance capacitor Cri.

In sub-period T3, the same state continues that the switching element Q1 is OFF and the switching element Q2 is ON. In this case, there are an interval (I) in which the currents ILr, IQ2, ICi, and Icri pass clockwise through the path extending along C1, Q2, Lr, P, Cri, and Ci, to discharge the input smoothing capacitor Ci and charge the current resonance capacitor Cri and an interval (II) in which the currents ICrb, IDa, ILr, and IQ2 pass through a path extending along Crb, Da, Q2, Lr, P, and Crb, to discharge the feedback capacitor Crb.

In sub-period T4, a sudden change occurs so that the switching element Q1 is ON and the switching element Q2 is OFF. In this case, there are an interval (I) in which the currents ICrb, IDa, ICi, ILr, and IQ1 pass through a path extending along Crb, Da, Ci, Q1, Lr, P, and Crb, to discharge the feedback capacitor Crb and charge the input smoothing capacitor Ci and an interval (II) in which the currents Icri, IQ1, and ILr pass clockwise through a path extending along P, Cri, Q1, Lr, and P, to charge the current resonance capacitor Cri.

In sub-period T5, the same state continues that the switching element Q1 is ON and the switching element Q2 is OFF. At this time, the currents Icri, IQ1, and ILr pass counterclockwise through a path extending along Cri, P, Lr, Q1, and Cri, to discharge the current resonance capacitor Cri.

In sub-period T6, the same state continues that the switching element Q1 is ON and the switching element Q2 is OFF. In this case, there are an interval (I) in which the currents ICrb, ILr, IQ1, and IDb pass through a path extending along AC, FL, Crb, P, Lr, Q1, Db, FL, and AC, to charge the feedback capacitor Crb from the AC power source AC and an interval (II) in which the currents Icri, ILr, and IQ1 pass counterclockwise through a path extending along Cri, P, Lr, Q1, and Cri, to discharge the current resonance capacitor Cri.

In sub-period T7, the same state continues that the switching element Q1 is ON and the switching element Q2 is OFF. In this case, there are an interval (I) in which the currents ICrb, ILr, IQ1, and IDb pass through the path extending along AC, FL, Crb, P, Lr, Q1, Db, FL, and AC, to charge the feedback capacitor Crb from the AC power source AC and an interval (II) in which the currents Icri, ILr, and IQ1 pass counterclockwise through the path extending along Cri, P, Lr, Q1, and Cri, to discharge the current resonance capacitor Cri.

In each of sub-periods T4 to T6, a current passes through the secondary side of the transformer T to supply power to the load.

Figure 10:
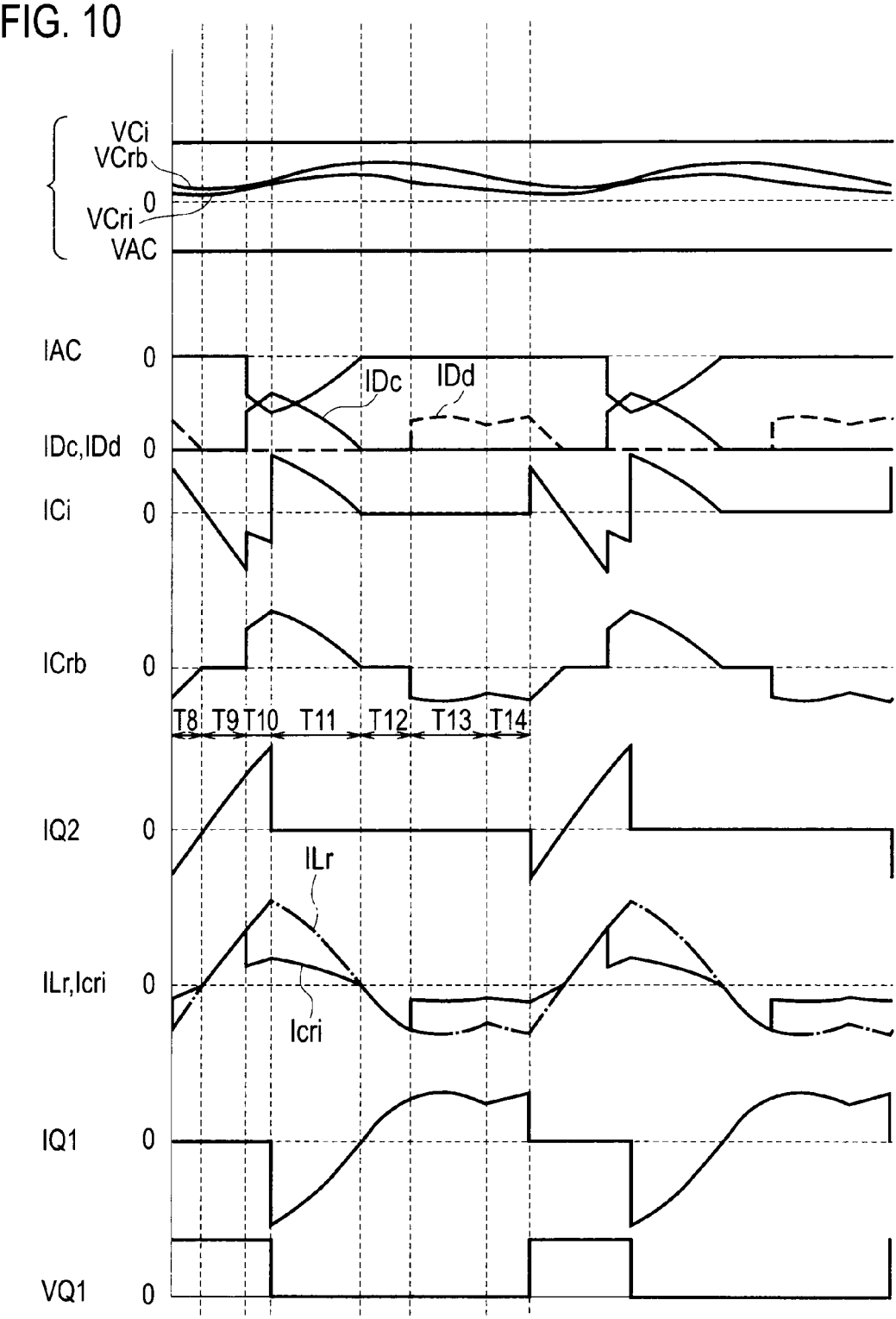
FIG. 10 is a view illustrating waveforms at the different locations of the converter of FIG. 8 when a lower end of the AC power source AC of FIG. 8 is positive.

FIG. 10 illustrates waveforms at the different locations of the converter of the present embodiment when a lower end of the AC power source AC is positive. Operation of each period will be explained by dividing the period into sub-periods T8 to T14. The feedback capacitor Crb is charged so that a terminal thereof connected to the bridge rectifier DB and filter circuit FL is positive. In the following explanation, explanation about a current on the secondary side of the transformer T that passes at the same timing as that of the related art is omitted. Also omitted is explanation about the current and quasi-voltage-resonance operation of the voltage resonance capacitor Crv.

In sub-period T8, the switching element Q1 is OFF and the switching element Q2 is ON. In this case, there are a current path (I) extending along Crb, P, Lr, Q2, Ci, Dd, and Crb and a current path (II) (for in a counterclockwise manner) extending along Cri, P, Lr, Q2, Ci, and Cri. Through one of the current paths, the currents ICrb, ILr, IQ2, ICi, and Icri pass, to discharge the feedback capacitor Crb, charge the input smoothing capacitor Ci, and discharge the current resonance capacitor Cri.

In sub-period T9, the same state continues that the switching element Q1 is OFF and the switching element Q2 is ON. At this time, the currents IC1, IQ2, ILr, and Icri pass clockwise through the path extending along C1, Q2, Lr, P, Cri, and Ci, to discharge the input smoothing capacitor Ci and charge the current resonance capacitor Cri.

In sub-period T10, the same state continues that the switching element Q1 is OFF and the switching element Q2 is ON. In this case, there are an interval (I) in which the currents IC1, IQ2, ILr, and Icri pass clockwise through the path extending along C1, Q2, Lr, P, Cri, and Ci, to discharge the input smoothing capacitor Ci and charge the current resonance capacitor Cri and an interval (II) in which the currents IDc, IQ2, ILr, and ICrb pass through a path extending along AC, FL, Dc, Q2, Lr, P, Crb, FL, and AC, to charge the feedback capacitor Crb from the AC power source AC.

In sub-period T11, a sudden change occurs so that the switching element Q1 is ON and the switching element Q2 is OFF. In this case, there are an interval (I) in which the currents IDc, IC1, IQ1, ILr, and Icri pass through a path extending along AC, Dc, Ci, Q1, Lr, P, Crb, FL, and AC, to charge the input smoothing capacitor Ci and feedback capacitor Crb from the AC power source AC and an interval (II) in which the currents Icri, IQ1, and ILr pass clockwise through the path extending along P, Cri, Q1, Lr, and P, to charge the current resonance capacitor Cri.

In sub-period T12, the same state continues that the switching element Q1 is ON and the switching element Q2 is OFF. At this time, the currents Icri and ILr pass counterclockwise through the path extending along Cri, P, Lr, Q1, and Cri, to discharge the current resonance capacitor Cri.

In sub-period T13, the same state continues that the switching element Q1 is ON and the switching element Q2 is OFF. In this case, there are an interval (I) in which the currents ICrb, ILr, IQ1, and IDb pass through a path extending along Crb, P, Lr, Q1, Dd, and Crb, to discharge the feedback capacitor Crb and an interval (II) in which the currents Icri, ILr, and IQ1 pass counterclockwise through the path extending along Cri, P, Lr, Q1, and Cri, to discharge the current resonance capacitor Cri.

In sub-period T14, the same state continues that the switching element Q1 is ON and the switching element Q2 is OFT. In this case, there are an interval (I) in which the currents ICrb, ILr, IQ1, and IDd pass through the path extending along Crb, P, Lr, Q1, Dd, and Crb, to discharge the feedback capacitor Crb and an interval (II) in which the currents Icri, ILr, and IQ1 pass counterclockwise through the path extending along Cri, P, Lr, Q1, and Cri, to discharge the current resonance capacitor Cri.

In each of sub-periods T11 to T13, a current passes through the secondary side of the transformer T, to supply power to the load.

Figure 11:
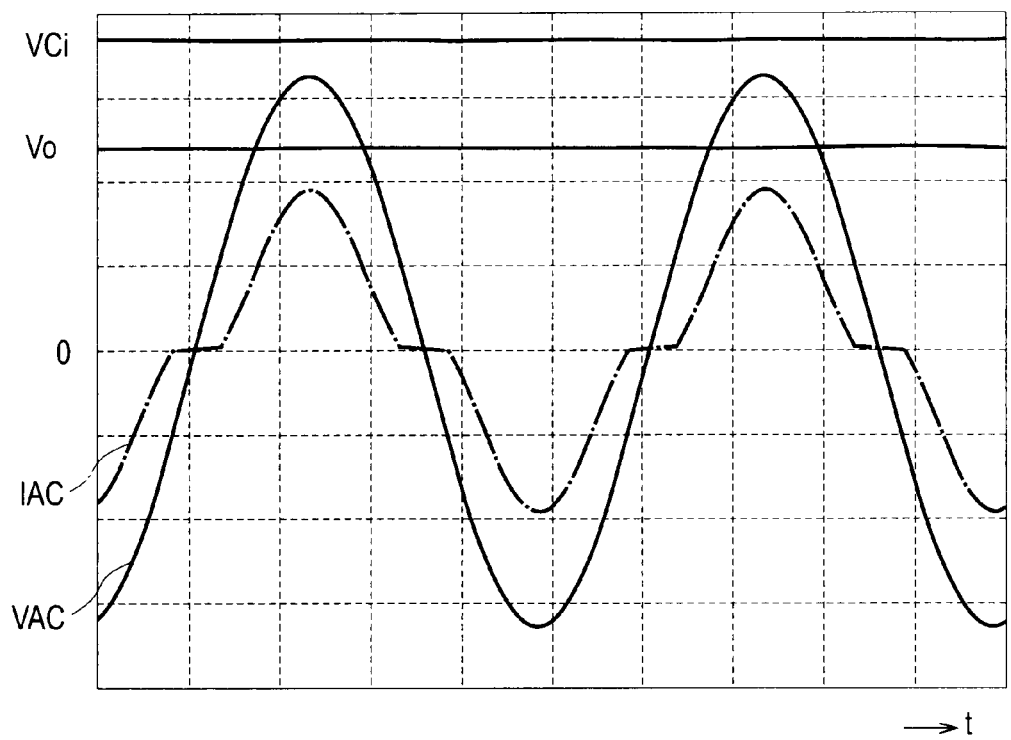
FIG. 11 is a view illustrating waveforms at different locations of the converter of FIG. 8.

In this way, the converter according to the present embodiment additionally employs the feedback capacitor Crb, to form new current paths. Even if the voltage of the AC power source AC is lower than the voltage of the input smoothing capacitor Ci, the input smoothing capacitor Ci is charged to pass an AC power source current with respect to a wide range of AC power source voltages. Accordingly, as illustrated in FIG. 11, the present embodiment is capable of providing an AC power source current IAC whose waveform approximately follows the waveform of an AC power source voltage VAC, thereby correcting a power factor and reducing harmonic currents.

The converter having a power factor correcting function according to the related art is capable of controlling only an output voltage and is almost incapable of controlling step-up energy in a heavy load or light load state. If a sufficient step-up voltage is set for a heavy load state, the voltage of the input smoothing capacitor Ci extremely increases under a light load state. This means that the related art must provide the input smoothing capacitor Ci with a large withstand voltage. This results in increasing the withstand voltage of the related-art converter.

On the other hand, the converter according to the present embodiment additionally employs the feedback capacitor Crb to partly pass a load current. Accordingly, step-up energy changes in response to a load current, so that the voltage of the input smoothing capacitor Ci will not extremely increase under a light load state. Therefore, there is no need for the present embodiment to increase the withstand voltage of the input smoothing capacitor Ci.

The converter of Embodiment 1 is an improvement based on a half-wave-rectifying current resonance converter, and therefore, is capable of properly carrying out conventional current resonance operation and quasi-voltage-resonance operation. With this, the converter according to Embodiment 1 realizes the power factor correcting function that works efficiently without increasing noise.

Embodiment 2

Figure 12:
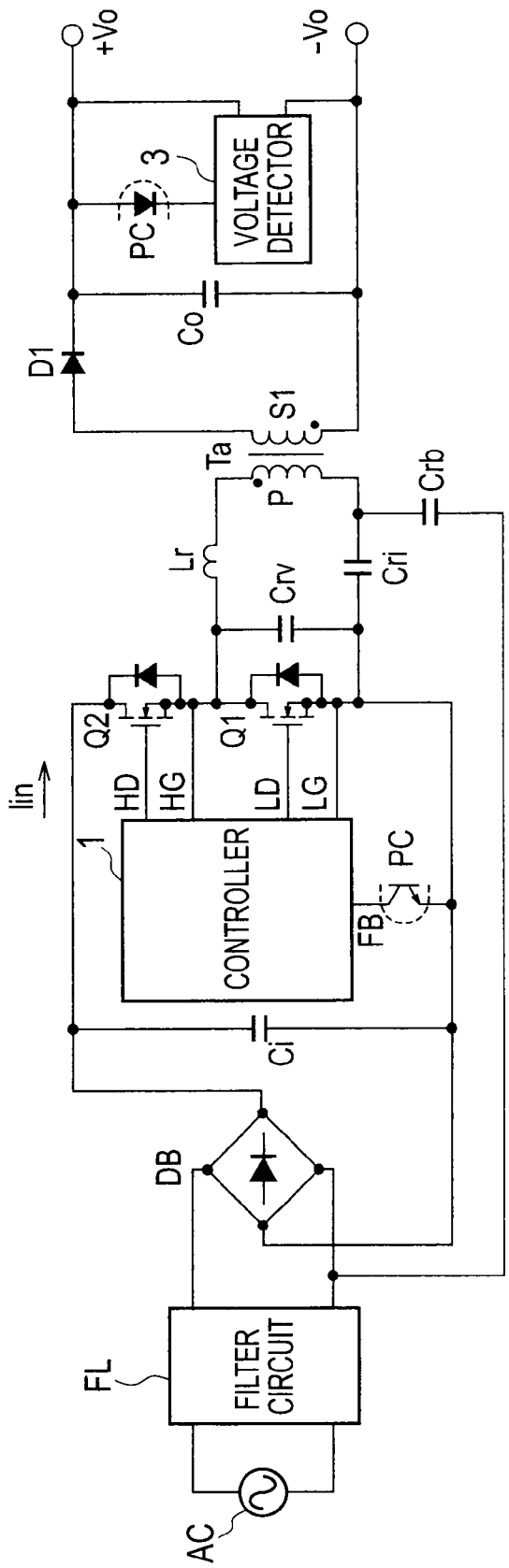
FIG. 12 is a circuit diagram illustrating a converter according to Embodiment 2 of the present invention.

FIG. 12 is a circuit diagram illustrating a converter according to Embodiment 2 of the present invention. Embodiment 2 differs from Embodiment 1 of FIG. 8 in that Embodiment 2 connects a second end of the feedback capacitor Crb to a connection point of the filter circuit FL and bridge rectifier DB.

The converter of Embodiment 2 operates like the converter of Embodiment 1 and provides effect similar to that provided by the converter of Embodiment 1.

Embodiment 3

Figure 13:
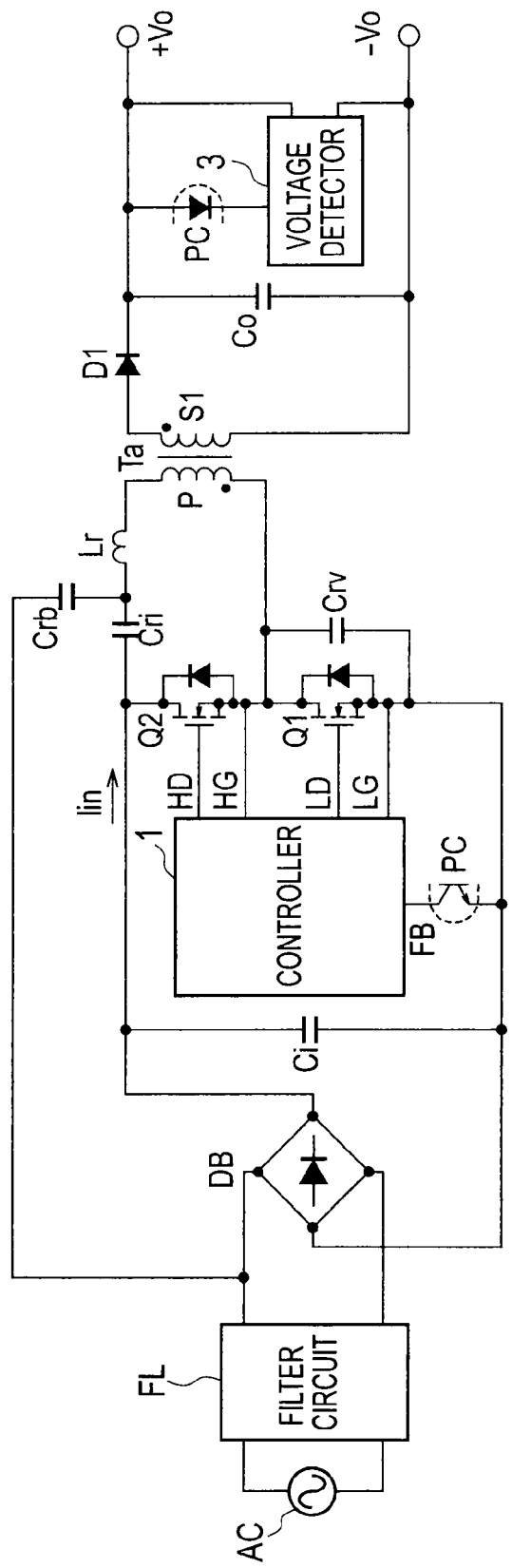
FIG. 13 is a circuit diagram illustrating a converter according to Embodiment 3 of the present invention.

FIG. 13 is a circuit diagram illustrating a converter according to Embodiment 3 of the present invention. Embodiment 3 differs from Embodiment 1 of FIG. 8 in that Embodiment 3 connects the series circuit including the current resonance capacitor Cri, leakage inductance Lr, and the primary winding P of the transformer T to the drain and source of the switching element Q2. The half-bridge converter employs the switching elements Q1 and Q2 that are up-down symmetrical, and therefore, the connecting position of the series circuit is changeable.

In this case, control signals for the switching elements Q1 and Q2 must be opposite to those of FIG. 8 depending on rectification polarities on the secondary side of the transformer T. Embodiment 3 provides effect similar to that provided by Embodiment 1.

According to Embodiment 3, the voltage resonance capacitor Crv may be connected to both ends of the switching element Q2 instead of those of the switching element Q1.

Embodiment 4

Figure 14:
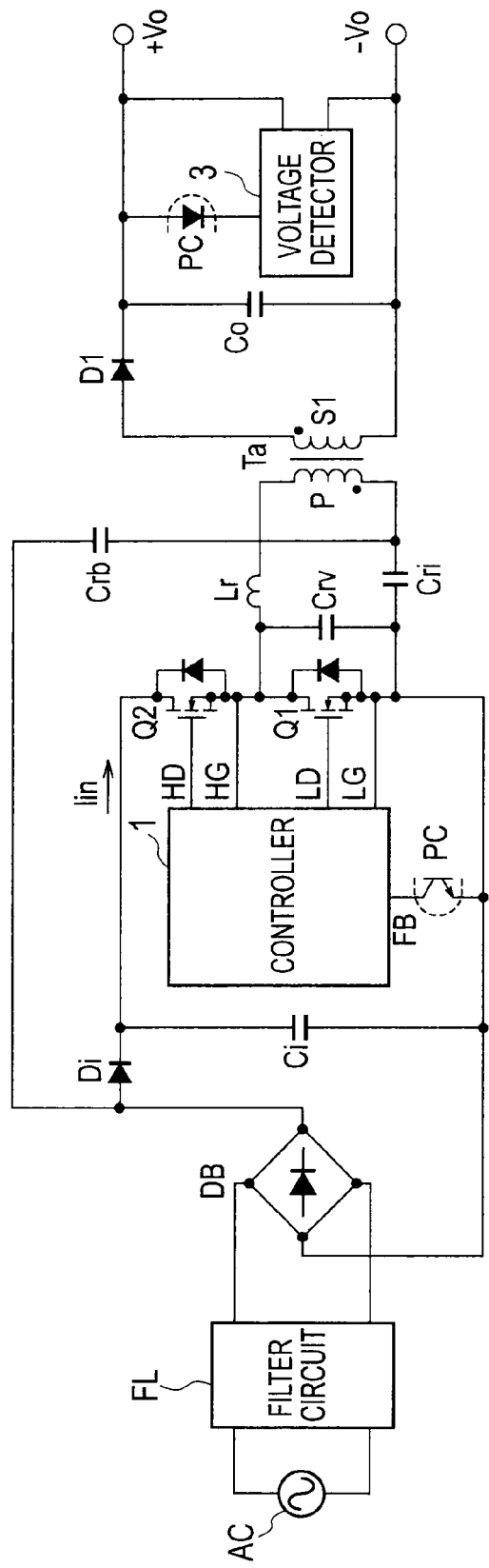
FIG. 14 is a circuit diagram illustrating a converter according to Embodiment 4 of the present invention.

FIG. 14 is a circuit diagram illustrating a converter according to Embodiment 4 of the present invention. Embodiment 4 differs from Embodiment 1 of FIG. 8 in that Embodiment 4 arranged a diode D1 between the bridge rectifier DB and a positive electrode of the input smoothing capacitor Ci and connects the second end of the feedback capacitor Crb between the bridge rectifier DB and the diode D1.

In this way, Embodiment 4 connects the feedback capacitor Crb to the output side of the bridge rectifier DB. Embodiment 4 provides effect similar to that provided by Embodiment 1.

Embodiment 5

Figure 15:
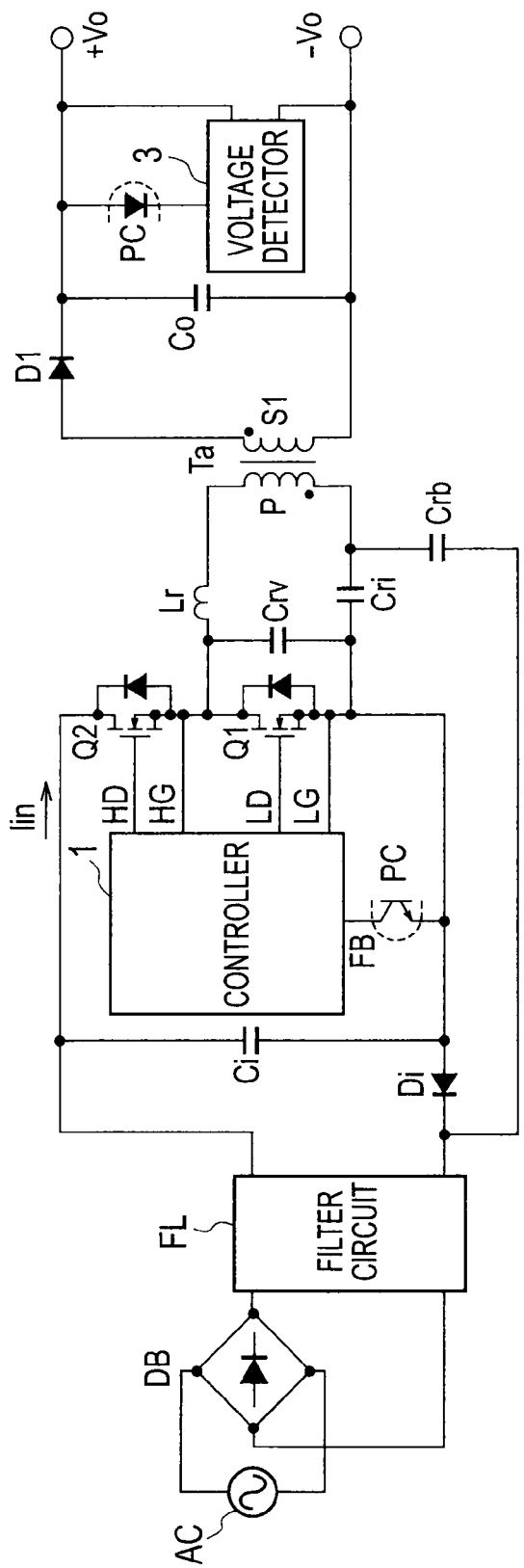
FIG. 15 is a circuit diagram illustrating a converter according to Embodiment 5 of the present invention.

FIG. 15 is a circuit diagram illustrating a converter according to Embodiment 5 of the present invention. Embodiment 5 differs from Embodiment 1 of FIG. 8 in that Embodiment 5 arranges a diode D1 between the output side of the bridge rectifier DB and the negative electrode of the input smoothing capacitor Ci and connects the feedback capacitor Crb between the output side of the bridge rectifier DB and the diode D1. In addition, Embodiment 5 moves the filter circuit FL to the output side of the bridge rectifier DB from the input side thereof.

Although Embodiment 5 connects the diode D1 to the negative electrode of the input smoothing capacitor Ci, it provides effect similar to that provided by Embodiment 1.

Embodiment 6

Figure 16:
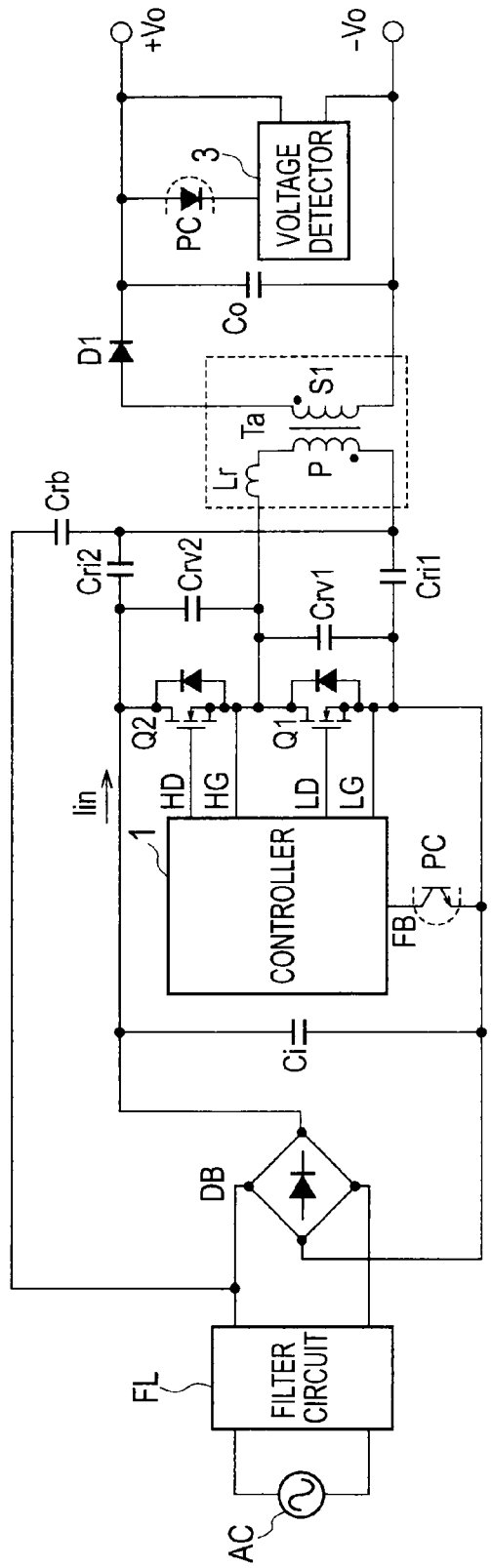
FIG. 16 is a circuit diagram illustrating a converter according to Embodiment 6 of the present invention.

FIG. 16 is a circuit diagram illustrating a converter according to Embodiment 6 of the present invention. Embodiment 6 differs from Embodiment 1 of FIG. 8 in that Embodiment 6 divides the current resonance capacitor Cri into current resonance capacitors Cri1 and Cri2 and connects a series circuit of the current resonance capacitors Cri1 and Cri2 in parallel with the input smoothing capacitor Ci.

Also, Embodiment 6 divides the voltage resonance capacitor Crv into voltage resonance capacitors Crv1 and Crv2 and connects the voltage resonance capacitors Crv1 and Crv2 in parallel with the switching elements Q1 and Q2, respectively. Embodiment 6 provides effect similar to that provided by Embodiment 1.

Embodiment 7

Figure 17:
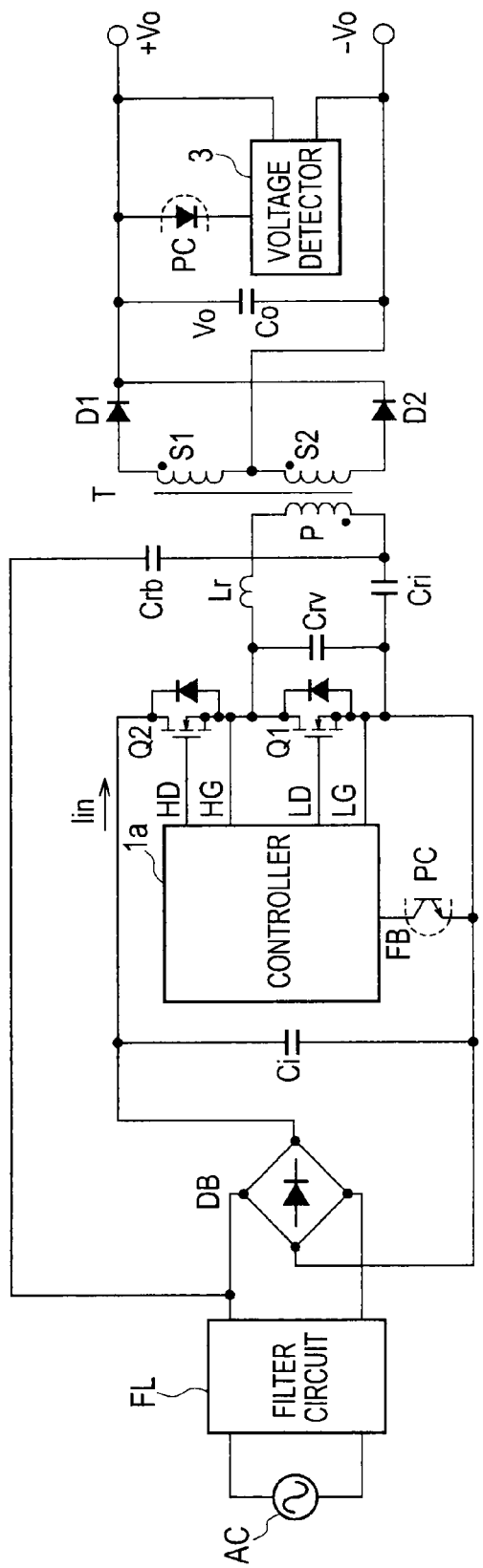
FIG. 17 is a circuit diagram illustrating a converter according to Embodiment 7 of the present invention.

FIG. 17 is a circuit diagram illustrating a converter according to Embodiment 7 of the present invention. Unlike the converter of Embodiment 1 illustrated in FIG. 8 that carries out half-wave rectification on the secondary side of the transformer T, Embodiment 7 illustrated in FIG. 17 carries out both-wave rectification on the secondary side of the transformer T. For this, the present embodiment provides the transformer T with first and second secondary windings S1 and S2. The secondary windings S1 and S2 are connected in series and employ a center tap configuration. In addition, the present embodiment employs diodes D1 and D2 serving as a both-wave rectifying circuit and connects the smoothing capacitor Co to the both-wave rectifying circuit.

Figure 18:
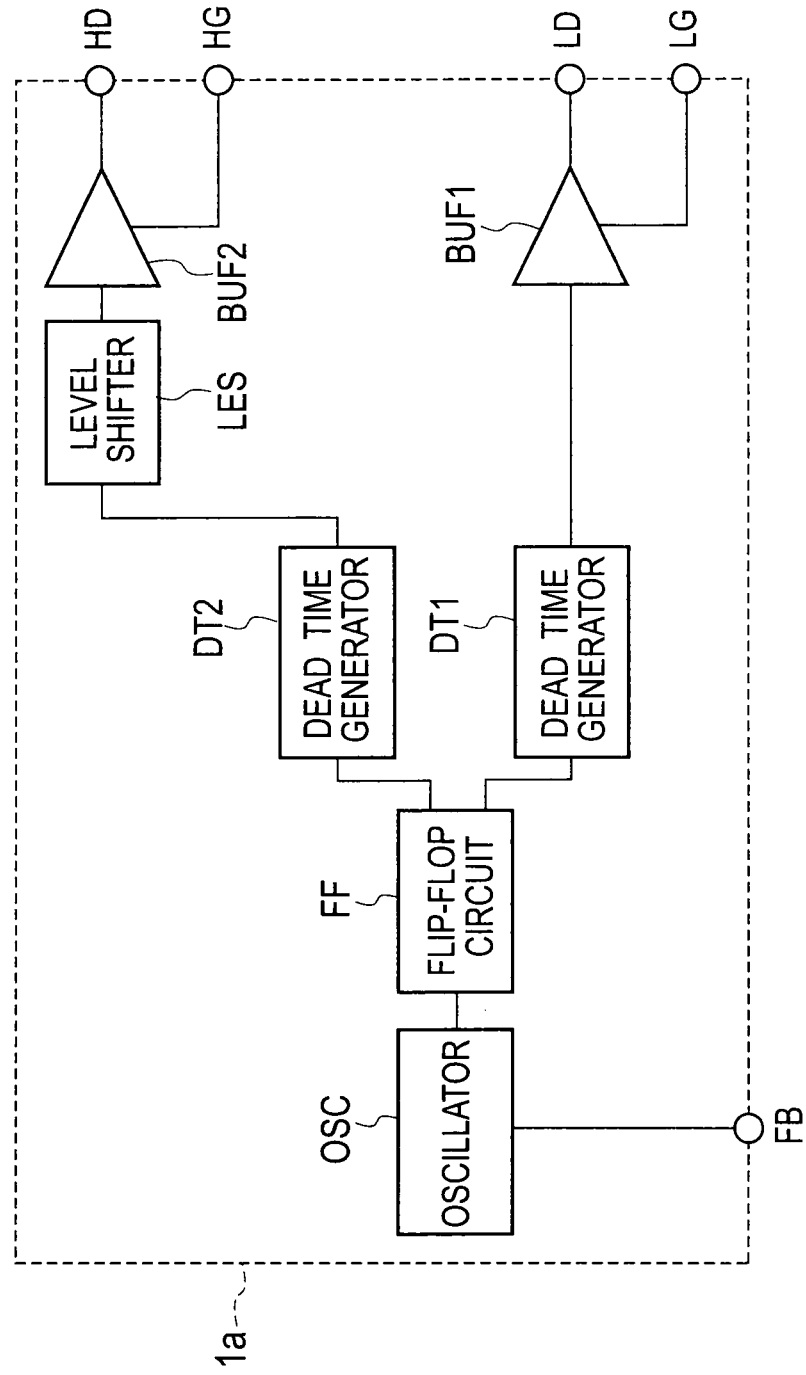
FIG. 18 is a circuit diagram illustrating a controller arranged in the converter of FIG. 17.

Namely, the DC-DC converter of the present embodiment is a both-wave-rectifying current resonance converter. This converter employs a different output voltage controlling technique from the half-wave-rectifying current resonance converter of Embodiment 1 illustrated in FIG. 8. For this, the present embodiment employs a controller 1a. FIG. 18 is a circuit diagram illustrating the details of the controller 1a. In FIG. 18, the controller 1a includes an oscillator OSC, a flip-flop FF, dead time generators DT1 and DT2, a level shifter LES, and buffers BUF1 and BUF2.

Operation of the both-wave-rectifying current resonance converter according to the present embodiment will be explained. The oscillator OSC outputs a signal to the flip-flop FF, which outputs two pulse signals that alternately turn on/off and each have a duty factor of 50%.

Figure 19:
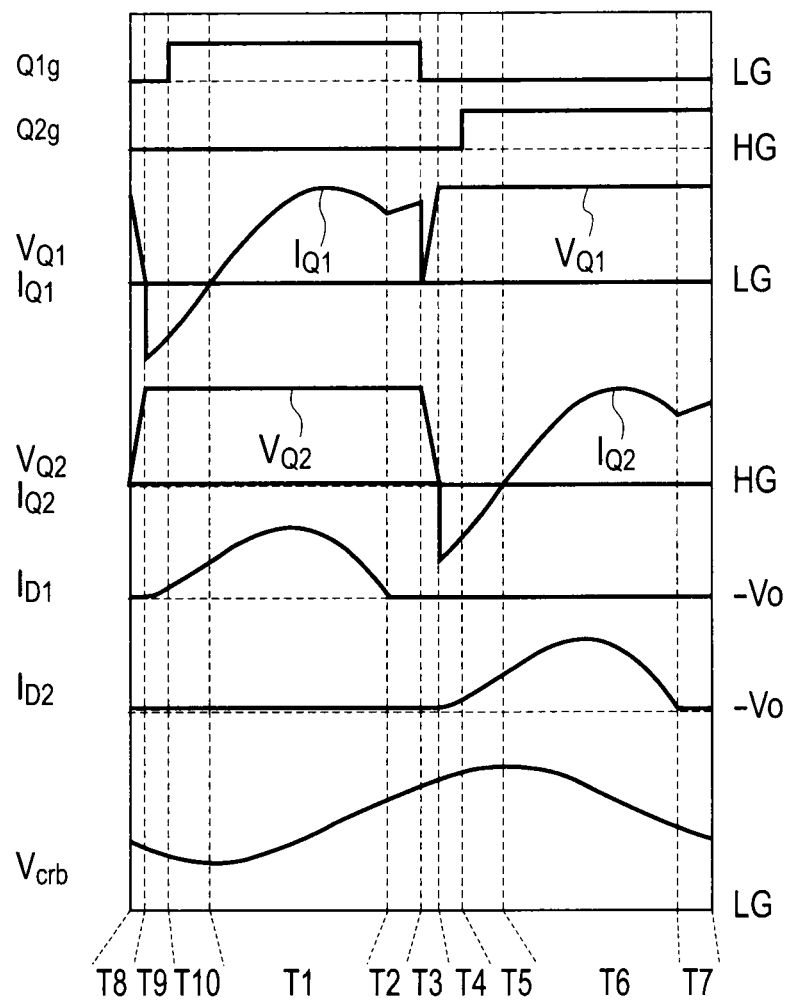
FIG. 19 is a view illustrating waveforms at different locations of the converter of FIG. 17.

One of the pulse signals is provided through the dead time generator DT1 and buffer BUF1, to output a gate drive signal (Q1g in FIG. 19) for a low-side switching element Q1.

The other pulse signal is provided through the dead time generator DT2, level shifter LES, and buffer BUF2, to output a gate drive signal (Q2g in FIG. 19) for a high-side switching element Q2. Namely, the switching elements Q1 and Q2 are alternately turned on/off with dead times generated by the dead time generators DT1 and DT2.

When the switching element Q2 turns on, a current IQ2 passes clockwise through a path extending along C1, Q2, Lr, P, Cri, and Ci. The current IQ2 is a resultant current of an excitation current passing through an excitation inductance Lp (not illustrated) on the primary side of the transformer T and a load current that is supplied through the primary winding P, secondary winding S2, diode D2, and smoothing capacitor Co to the load by way of terminals +Vo and −Vo.

The above-mentioned excitation current is a sinusoidal resonance current caused by leakage inductance Lr, excitation inductance Lp, and the current resonance capacitor Cri. Compared with the ON period of the switching element Q2, the resonance frequency is low, and therefore, the sinusoidal wave is partly observed as a triangular current. The load current mentioned above is a sinusoidal resonance current caused by resonance elements of the leakage inductance Lr and current resonance capacitor Cri.

When the switching element Q2 turns off, energy by excitation current accumulated in the transformer. T causes quasi-voltage resonance. This quasi-voltage resonance is caused by leakage inductance Lr, excitation inductance Lp, current resonance capacitor Cri, and voltage resonance capacitor Crv. In this case, a resonance frequency due to the voltage resonance capacitor Crv having smaller capacitance is observed as a voltage across the switching elements Q1 and Q2.

Namely, when the switching element Q2 turns off, the current IQ2 of the switching element Q2 is translocated to the voltage resonance capacitor Crv. When the voltage resonance capacitor Crv is discharged to zero volts, the current is translocated to a built-in diode of the switching element Q1. Namely, the energy by excitation current accumulated in the transformer T charges the current resonance capacitor Cri through the built-in diode of the switching element Q1. During this period, the switching element Q1 is turned on to realize zero-volt switching of the switching element Q1.

When the switching element Q1 turns on, the current resonance capacitor Cri serves as a power source to provide the current IQ1 counterclockwise through a path extending along Cri, P, Lr, Q1, and Cri. This current is a resultant current of an excitation current passing through the excitation inductance Lp on the primary side of the transformer T and a load current supplied through the primary winding P, secondary winding S1, diode D1, and smoothing capacitor Co to the load by way of the output terminals +Vo and −Vo.

The above-mentioned excitation current is a sinusoidal resonance current caused by the leakage inductance Lr, the excitation inductance Lp, and the current resonance capacitor Cri. Compared with the ON period of the switching element Q2, the resonance frequency is low, and therefore, the sinusoidal wave is partly observed as a triangular current. The load current mentioned above is a sinusoidal resonance current caused by resonance elements of the leakage inductance Lr and current resonance capacitor Cri.

When the switching element Q1 turns off, energy by excitation current accumulated in the transformer T causes quasi-voltage resonance. This quasi-voltage resonance is caused by the leakage inductance Lr, the excitation inductance Lp, the current resonance capacitor Cri, and the voltage resonance capacitor Crv. In this case, a resonance frequency due to the voltage resonance capacitor Crv having smaller capacitance is observed as a voltage across the switching elements Q1 and Q2.

Namely, when the switching element Q1 turns off, the current of the switching element Q1 is translocated to the voltage resonance capacitor Crv. When the voltage resonance capacitor Crv is charged to the power source voltage Vin, the current is translocated to a built-in diode of the switching element Q2. Namely, the energy by excitation current accumulated in the transformer T is regenerated through the built-in diode of the switching element Q2 to the input smoothing capacitor Ci. During this period, the switching element Q2 is turned on to realize zero-volt switching of the switching element Q2. Waveforms related to the operation mentioned above are illustrated in FIG. 19.

The converter according to the present embodiment illustrated in FIG. 17 employs the controller 1a to alternately turn on/off the switching elements Q1 and Q2 each with a fixed dead time and control the frequency of these switching elements. The present embodiment variably controls the switching frequency with respect to a change in an input voltage. This is carried out with the use of a fact that the frequency of a resonance current passing through the load is constant. By controlling the switching frequency of the switching elements Q1 and Q2, the present embodiment widens the ON width of the switching elements Q1 and Q2 to increase an excitation current, i.e., a circulating current, thereby changing the amplitude of the voltage of the current resonance capacitor Cri and control the output voltage.

Figure 20:
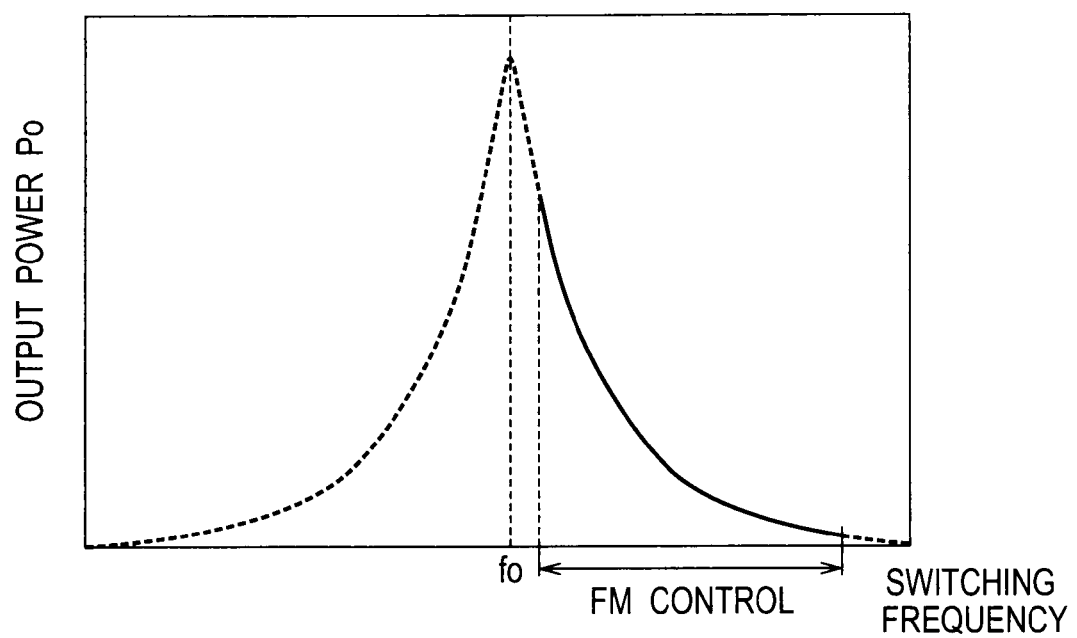
FIG. 20 is a graph illustrating a relationship between switching frequency and output power of the converter of FIG. 17.

FIG. 20 is a graph illustrating a relationship between switching frequency and output power. An error signal detected by the voltage detector 3 is transmitted as a current through the photocoupler PC to a terminal FB of the controller 1a. In the controller 1a, the oscillator OSC changes its frequency in response to the current to the terminal FB. Accordingly, the current resonance capacitor Cri generates an amplitude voltage with respect to a variation such as a load variation and an input voltage variation. The amplitude voltage is fed back through the feedback capacitor Crb to the input side, to charge the input smoothing capacitor Ci with a wide range of input voltages. Consequently, Embodiment 7 provides effect similar to that provided by Embodiment 1.

In this way, the converter according to any one of Embodiments 1 to 7 is a current resonance converter having a power factor correcting function that is realized only by adding a small number of parts. This converter produces little noise, is efficient, has the power factor correcting function, and therefore, is applicable to realize a power source apparatus conforming to harmonics regulations at low cost.

The current resonance converter according to any one of Embodiments 1 to 7 is easy to adjust step-up energy by properly setting constants for elements arranged in the converter, and therefore, is capable of realizing the power factor correcting function with a required minimum of step-up energy. The power factor correcting function provided by the current resonance converter of any one of Embodiments 1 to 7 is efficient and is achievable without deteriorating the resonance function.

Embodiment 8

Figure 21:
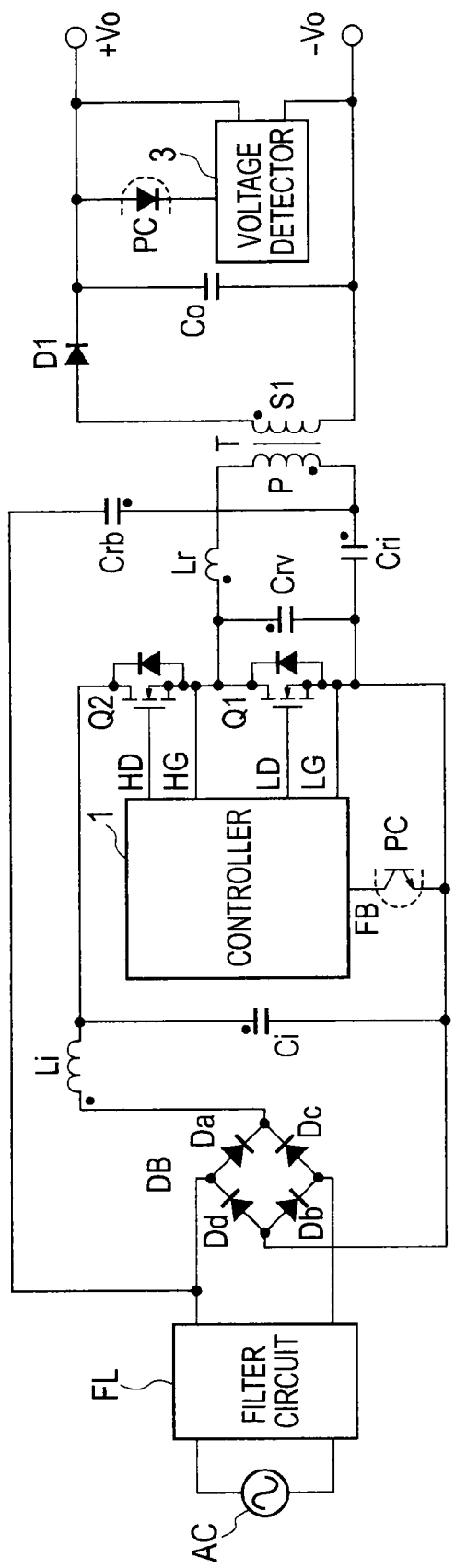
FIG. 21 is a circuit diagram illustrating a converter according to Embodiment 8 of the present invention.

FIG. 21 is a circuit diagram illustrating a converter according to Embodiment 8 of the present invention. In FIG. 21, an AC power source AC supplies an AC voltage through a filter circuit FL to a bridge rectifier DB. Both output ends of the bridge rectifier DB are connected to a series circuit including a reactor Li and an input smoothing capacitor Ci and a series circuit including switching elements Q1 and Q2 each being a MOSFET.

Connected between the drain and source of the switching elements Q1 are a voltage resonance capacitor Crv and a series circuit including a primary winding P of a transformer T and a current resonance capacitor Cri. Lr is a leakage inductance appearing between the primary winding P and a secondary winding S1 of the transformer T. The leakage inductance Lr may be a discrete reactor.

A connection point of the primary winding P of the transformer T and the current resonance capacitor Cri is connected to a first end of a feedback capacitor Crb. A second end of the feedback capacitor Crb is connected to a connection point of the bridge rectifier DB and filter circuit FL. This is equivalent to that the feedback capacitor Crb is connected to a first end of the AC power source AC, if the filter circuit FL is omitted.

The secondary winding S1 of the transformer T is connected to a series circuit including a rectifying diode D1 and a smoothing capacitor Co. The smoothing capacitor Co is connected to output terminals +Vo and −Vo and a voltage detector 3. The voltage detector 3 is connected to a photodiode of a photocoupler PC. The voltage detector 3 detects an output voltage of the smoothing capacitor Co and outputs the detected voltage as a feedback signal through the photodiode and phototransistor of the photocoupler PC to a feedback terminal FB of a controller 1.

Based on the feedback signal to the feedback terminal FB, the controller 1 carries out PWM control to alternately turn on/off the switching elements Q1 and Q2. Instead, the controller 1 may fix the ON period of one of the switching elements Q1 and Q2 and vary the ON period of the other.

This converter is characterized in that the reactor Li is connected between the bridge rectifier DB and the input smoothing capacitor Ci, the connection point of the transformer T and current resonance capacitor Cri is connected to the first end of the feedback capacitor Crb, and the connection point of the bridge rectifier DB and filter circuit FL is connected to the second end of the feedback capacitor Crb. Namely, the converter of FIG. 21 omits the step-up chopper of the PFC part A of the related art illustrated in FIG. 1 and newly employs the feedback capacitor Crb and reactor Li.

The converter according to the present embodiment is basically a half-wave-rectifying current resonance converter.

Operation of the converter according to the present embodiment will be explained with reference to FIG. 22 that illustrate waveforms at different locations of the converter of FIG. 21 when an upper end of the AC power source AC is positive. Operation of each period will be explained by dividing the period into sub-periods T1 to T8. The feedback capacitor Crb is charged to an opposite polarity with respect to a polarity as depicted by a dot.

In the following explanation, explanation about a current on the secondary side of the transformer T that passes at the same timing as that of the related art is omitted. Also omitted is explanation about the current and quasi-voltage-resonance operation of the voltage resonance capacitor Crv.

Figure 22:
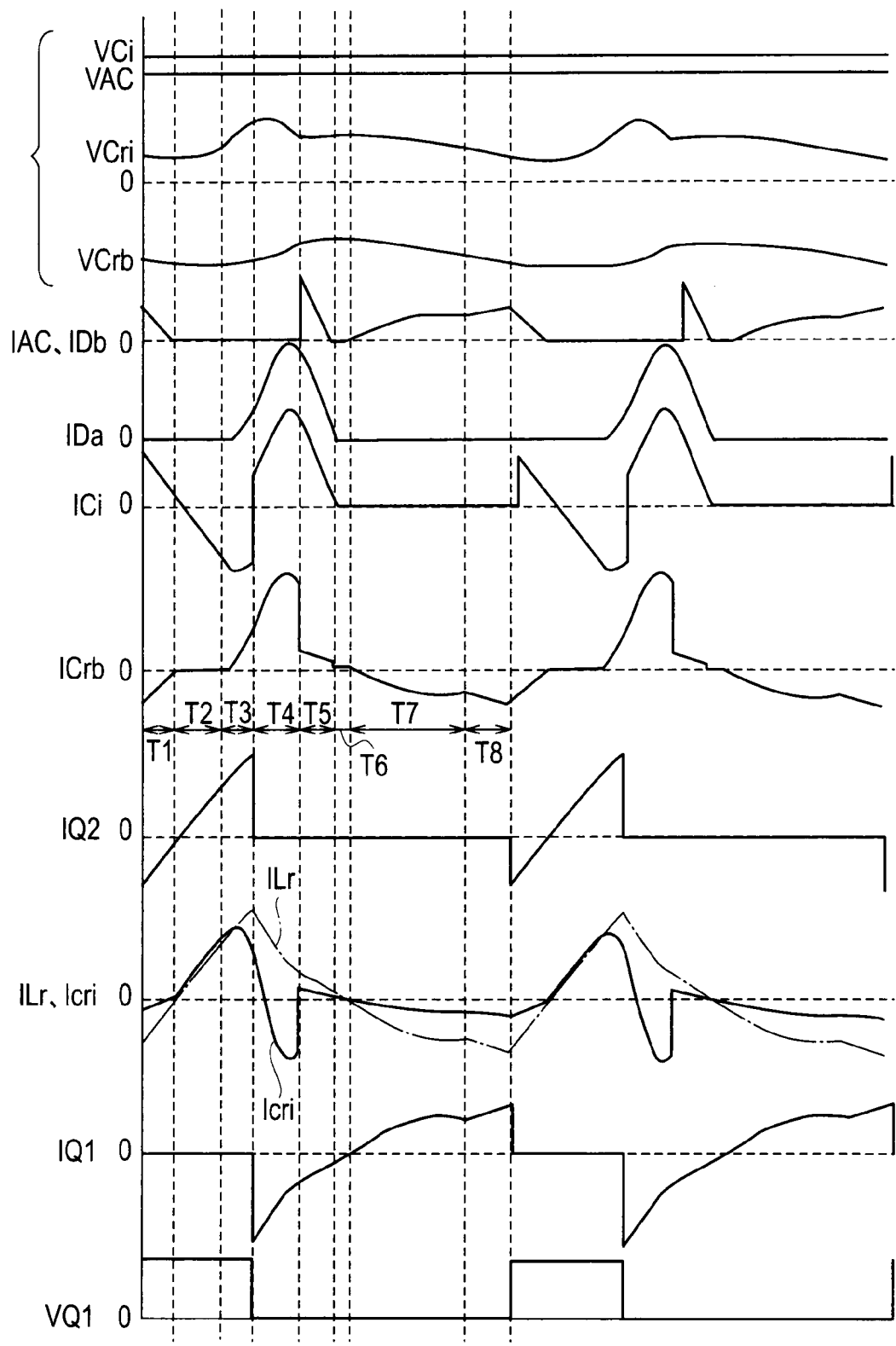
FIG. 22 is a view illustrating waveforms at different locations of the converter of FIG. 21 when an upper end of an AC power source AC of FIG. 21 is positive.

In FIG. 22, VAC represents a voltage across the AC power source AC, VCi a voltage across the input smoothing capacitor Ci, VCri a voltage across the current resonance capacitor Cri, VCrb a voltage across the feedback capacitor Crb, IAC a current passing through the AC power source AC, IDb a current of a diode Db, IDa is a current of a diode Da, ICi a current of the input smoothing capacitor Ci, ICrb a current of the feedback capacitor Crb, IQ2 a current of the drain of the switching element Q2, ILr a current of the leakage inductance Lr, Icri a current of the current resonance capacitor Cri, IQ1 a current of the drain of the switching element Q1, and Q1 is a drain-source voltage of the switching element Q1.

In sub-period T1, the switching element Q1 is OFF and the switching element Q2 is ON. At this time, there are two current paths, i.e., a first path (I) extending along AC, FL, Crb, P, Lr, Q2, Ci, Db, FL, and AC and a second path (II) (for in a counterclockwise manner) extending along Cri, P, Lr, Q2, Ci, and Cri. Through one of the current paths, the currents ICrb, ILr, IQ2, ICi, IDb, and Icri pass. As a result, the AC power source AC charges the input smoothing capacitor Ci to charge the feedback capacitor Crb and discharge the current resonance capacitor Cri.

In sub-period T2, the same state continues that the switching element Q1 is OFF and the switching element Q2 is ON. At this time, the currents IC1, IQ2, ILr, and Icri pass clockwise through a path extending along C1, Q2, Lr, P, Cri, and Ci, to discharge the input smoothing capacitor Ci and charge the current resonance capacitor Cri.

In sub-period T3, the same state continues that the switching element Q1 is OFF and the switching element Q2 is ON. In this case, there are an interval (I) in which the currents ICi, ILr, IQ2, and Icri pass clockwise through the path extending along C1, Q2, Lr, P, Cri, and Ci, to discharge the input smoothing capacitor Ci and charge the current resonance capacitor Cri and an interval (II) in which the currents ICrb, IDa, IL1, IQ2, and ILr pass through a path extending along Crb, Da, L1, Q2, Lr, P, and Crb, to discharge the feedback capacitor Crb.

In sub-period T4, a sudden change occurs so that the switching element Q1 is ON and the switching element Q2 is OFF. In this case, there are an interval (I) in which the currents ICrb, IDa, IL1, IQ1, ICi, and ILr pass through a path extending along Crb, Da, Li, Ci, Q1, Lr, P, and Crb, to discharge the feedback capacitor Crb and charge the input smoothing capacitor Ci and an interval (II) in which the currents Icri, IQ1, and ILr pass clockwise through a path extending along P, Cri, Q1, Lr, and P, to charge the current resonance capacitor Cri.

In sub-period T5, the same state continues that the switching element Q1 is ON and the switching element Q2 is OFF. In this case, there are an interval (I) in which the currents ICrb, IDa, ILi, IC1, IQ1, and ILr pass through the path extending along Crb, Da, Li, Ci, Q1, Lr, P, and Crb, to discharge the feedback capacitor Crb and charge the input smoothing capacitor Ci, an interval (II) in which the currents Icri, IQ1, and ILr pass clockwise through a path extending along P, Cri, Q1, Lr, and P, to charge the current resonance capacitor Cri, and an interval (III) in which the currents IDa, ILi, ICi, and IDb pass through a path extending along AC, FL, Da, Li, Ci, Db, FL, and AC, to charge the input smoothing capacitor Ci directly from the AC power source AC.

In sub-period T6, the same state continues that the switching element Q1 is ON and the switching element Q2 is OFF. At this time, the currents Icri, IQ1, and ILr pass through the path extending along P, Cri, Q1, Lr, and P, to charge the current resonance capacitor Cri.

In sub-period T7, the same state continues that the switching element Q1 is ON and the switching element Q2 is OFF. In this case, there are an interval (I) in which the currents ICrb, ILr, IQ1, and IDb pass through a path extending along AC, FL, Crb, P, Lr, Q1, Db, FL, and AC, to charge the feedback capacitor Crb from the AC power source AC and an interval (II) in which the currents Icri, ILr, and IQ1 pass counterclockwise through a path extending along Cri, P, Lr, Q1, and Cri, to discharge the current resonance capacitor Cri.

In sub-period T8, the same state continues that the switching element Q1 is ON and the switching element Q2 is OFF. In this case, there are an interval (I) in which the currents ICrb, ILr, IQ1, and IDb pass through the path extending along AC, FL, Crb, P, Lr, Q1, Db, FL, and AC, to charge the feedback capacitor Crb from the AC power source AC and an interval (II) in which the currents Icri, ILr, and IQ1 pass through the path extending along Cri, P, Lr, Q1, and Cri, to discharge the current resonance capacitor Cri.

In each of sub-periods T4 to T7, a current passes through the secondary side of the transformer T, to supply power to a load.

Figure 23:
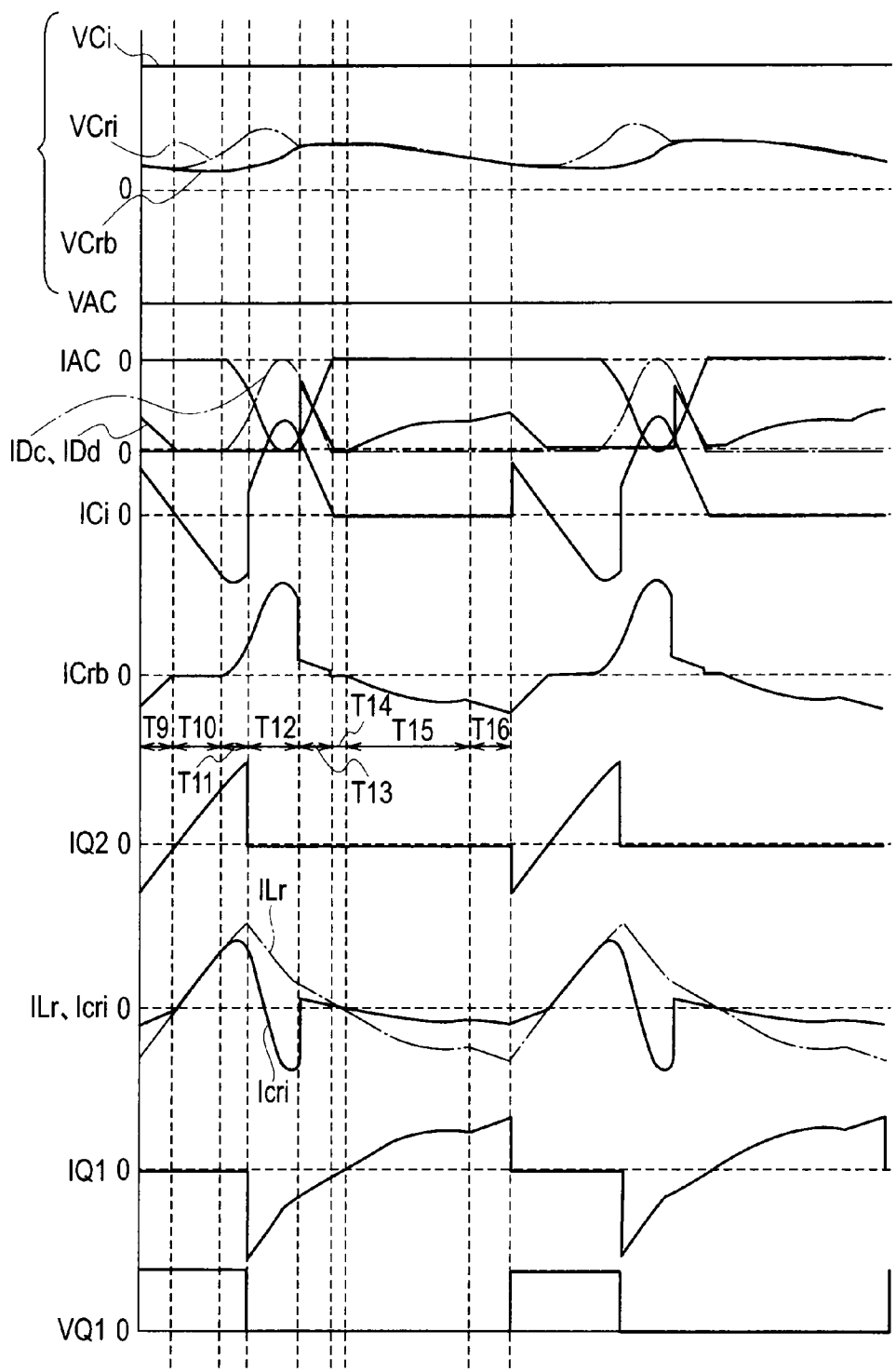
FIG. 23 is a view illustrating waveforms at the different locations of the converter of FIG. 21 when a lower end of the AC power source AC of FIG. 21 is positive.

FIG. 23 illustrates waveforms at the different locations of the converter of Embodiment 8 when a lower end of the AC power source AC of FIG. 21 is positive. Operation of each period will be explained by dividing the period into sub-periods T9 to T16. The feedback capacitor Crb is charged to a positive polarity with respect to a polarity indicated with a dot. In the following explanation, explanation about a current on the secondary side of the transformer T that passes at the same timing as that of the related art is omitted. Also omitted is explanation about the current and quasi-voltage-resonance operation of the voltage resonance capacitor Crv.

In sub-period T9, the switching element Q1 is OFF and the switching element Q2 is ON. In this case, there are a current path (I) extending along Crb, P, Lr, Q2, Ci, Dd, and Crb and a current path (II) (for in a counterclockwise manner) extending along Cri, P, Lr, Q2, Ci, and Cri. Through one of the current paths, the currents ICrb, ILr, IQ2, ICi, IDd, and Icri pass, to discharge the feedback capacitor Crb and current resonance capacitor Cri and charge the input smoothing capacitor Ci.

In sub-period T10, the same state continues that the switching element Q1 is OFF and the switching element Q2 is ON. At this time, the currents IC1, IQ2, ILr, and Icri pass through the path extending along C1, Q2, Lr, P, Cri, and Ci, to discharge the input smoothing capacitor Ci and charge the current resonance capacitor Cri.

In sub-period T11, the same state continues that the switching element Q1 is OFF and the switching element Q2 is ON. In this case, there are an interval (I) in which the currents IC1, IQ2, ILr, and Icri pass clockwise through the path extending along C1, Q2, Lr, P, Cri, and Ci, to discharge the input smoothing capacitor Ci and charge the current resonance capacitor Cri and an interval (II) in which the currents IDc, IL1, IQ2, ILr, and ICrb pass through a path extending along AC, FL, Dc, L1, Q2, Lr, P, Crb, FL, and AC, to charge the feedback capacitor Crb from the AC power source AC.

In sub-period T12, a sudden change occurs so that the switching element Q1 is ON and the switching element Q2 is OFF. In this case, there are an interval (I) in which the currents IDc, ILi, IC1, IQ1, ILr, and ICrb pass through a path extending along AC, FL, Dc, Li, Ci, Q1, Lr, P, Crb, FL, and AC, to charge the input smoothing capacitor Ci and feedback capacitor Crb from the AC power source AC and an interval (II) in which the currents Icri, IQ1, and ILr pass clockwise through the path extending along P, Cri, Q1, Lr, and P, to charge the current resonance capacitor Cri.

In sub-period T13, the same state continues that the switching element Q1 is ON and the switching element Q2 is OFF. In this case, there are an interval (I) in which the currents IDc, ILi, IC1, IQ1, ILr, and ICrb pass through a path extending along AC, FL, Dc, Li, Ci, Q1, Lr, P, Crb, FL, and AC, to charge the input smoothing capacitor Ci and feedback capacitor Crb from the AC power source AC, an interval (II) in which the currents Icri, IQ1, and ILr pass clockwise through the path extending along P, Cri, Q1, Lr, and P, to charge the current resonance capacitor Cri, and an interval (III) in which the currents IDc, ILi, ICi, and IDd pass through a path extending along AC, FL, Dc, Li, Ci, Dd, FL, and AC, to charge the input smoothing capacitor Ci directly from the AC power source AC.

In sub-period T14, the same state continues that the switching element Q1 is ON and the switching element Q2 is OFF. At this time, the currents Icri, IQ1, and ILr pass clockwise through the path extending along P, Cri, Q1, Lr, and P, to charge the current resonance capacitor Cri.

In sub-period T15, the same state continues that the switching element Q1 is ON and the switching element Q2 is OFF. In this case, there are an interval (I) in which the currents ICrb, ILr, IQ1, and IDb pass through a path extending along Crb, P, Lr, Q1, Dd, and Crb, to discharge the feedback capacitor Crb and an interval (II) in which the currents Icri, ILr, and IQ1 pass counterclockwise through the path extending along Cri, P, Lr, Q1, and Cri, to discharge the current resonance capacitor Cri.

In sub-period T16, the same state continues that the switching element Q1 is ON and the switching element Q2 is OFF. In this case, there are an interval (I) in which the currents ICrb, ILr, IQ1, and IDd pass through the path extending along Crb, P, Lr, Q1, Dd, and Crb, to discharge the feedback capacitor Crb and an interval (II) in which the currents Icri, ILr, and IQ1 pass counterclockwise through the path extending along Cri, P, Lr, Q1, and Cri, to discharge the current resonance capacitor Cri.

In each of sub-periods T12 to T15, a current passes through the secondary side of the transformer T, to supply power to the load.

Figure 24:
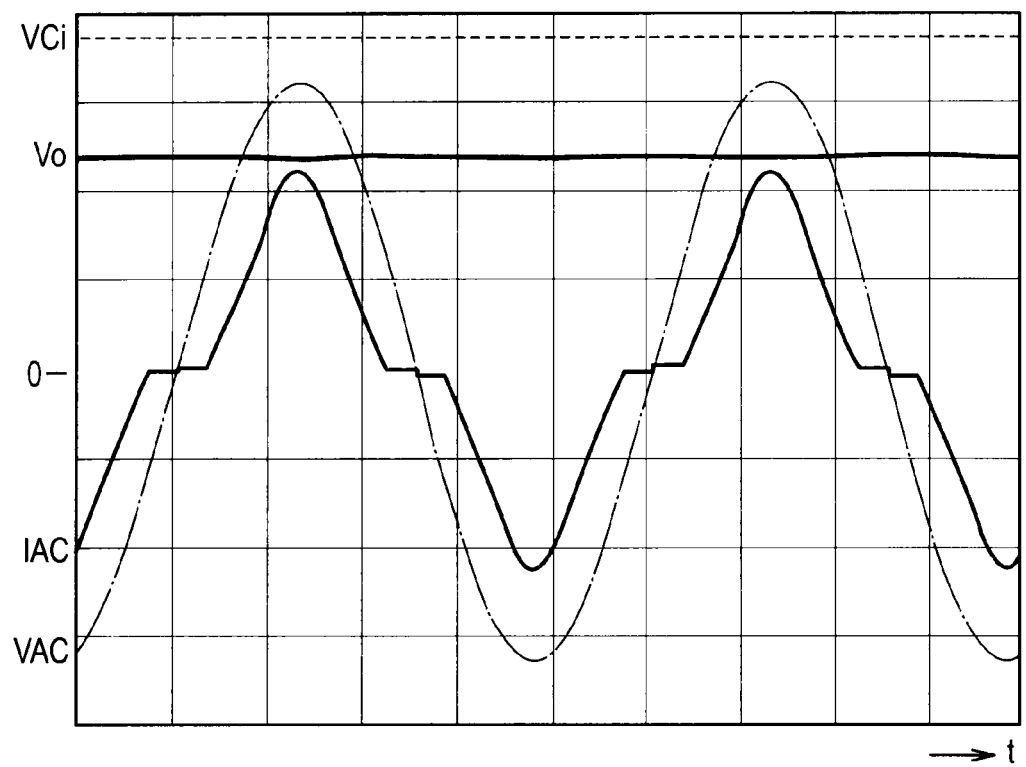
FIG. 24 is a view illustrating waveforms at different locations of the converter of FIG. 21.

In this way, the converter according to Embodiment 8 additionally employs the reactor Li and feedback capacitor Crb, to form new current paths. Even if the voltage of the AC power source AC is lower than the voltage of the input smoothing capacitor Ci, the input smoothing capacitor Ci is charged to pass an AC power source current with respect to a wide range of AC power source voltages. Accordingly, as illustrated in FIG. 24, the present embodiment is capable of providing an AC power source current IAC whose waveform approximately follows the waveform of an AC power source voltage VAC, thereby correcting a power factor and reducing harmonic currents.

The converter having a power factor correcting function according to the related art is capable of controlling only an output voltage and is almost incapable of controlling step-up energy in a heavy load or light load state. If a sufficient step-up voltage is set for a heavy load state, the voltage of the input smoothing capacitor Ci extremely increases under a light load state. This means that the related art must provide the input smoothing capacitor Ci with a large withstand voltage. This results in increasing the withstand voltage of the related-art converter.

On the other hand, the converter according to Embodiment 8 additionally employs the feedback capacitor Crb and reactor Li to partly pass a load current. Accordingly, step-up energy changes in response to a load current, so that the voltage of the input smoothing capacitor Ci will not extremely increase under a light load state. Therefore, there is no need for Embodiment 8 to increase the withstand voltage of the input smoothing capacitor Ci.

The converter of Embodiment 8 is an improvement based on a half-wave-rectifying current resonance converter, and therefore, is capable of properly carrying out conventional current resonance operation and quasi-voltage-resonance operation. With this, the converter according to Embodiment 8 realizes the power factor correcting function that works efficiently without increasing noise.

Embodiment 9

Figure 25:
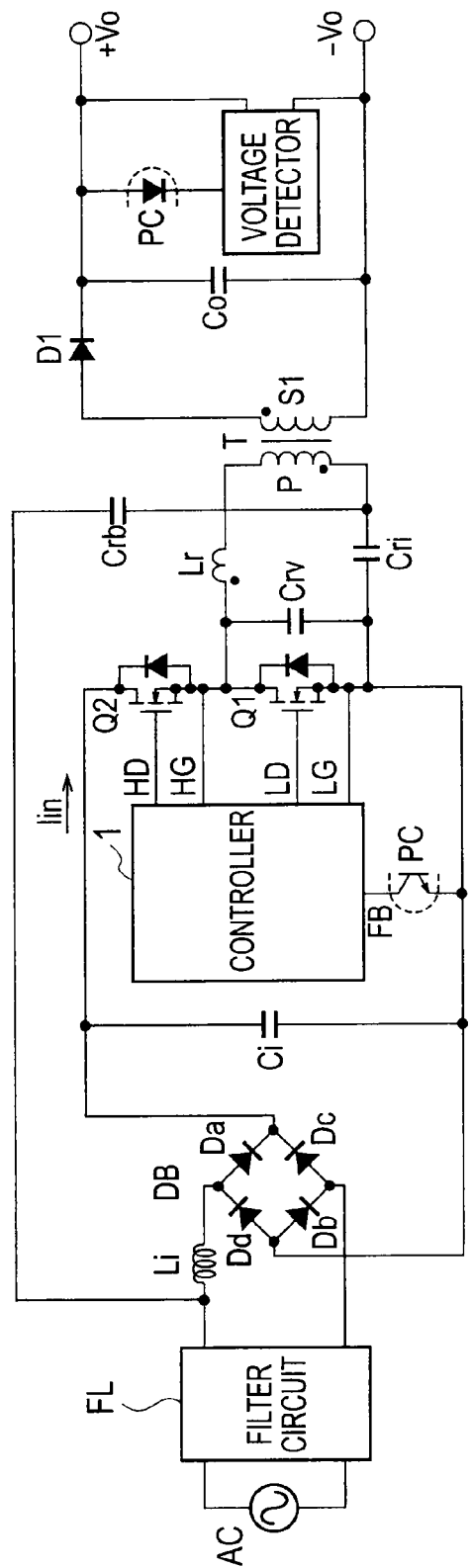
FIG. 25 is a circuit diagram illustrating a converter according to Embodiment 9 of the present invention.

FIG. 25 is a circuit diagram illustrating a converter according to Embodiment 9 of the present invention. Embodiment 9 differs from Embodiment 8 of FIG. 21 in that Embodiment 9 connects the reactor Li between an output end of the filter circuit FL and an input end of the bridge rectifier DB and connects the second end of the feedback capacitor Crb between the AC power source AC and the reactor Li.

The converter of Embodiment 9 operates like the converter of Embodiment 8 and provides effect similar to that provided by the converter of Embodiment 8.

Embodiment 10

Figure 26:
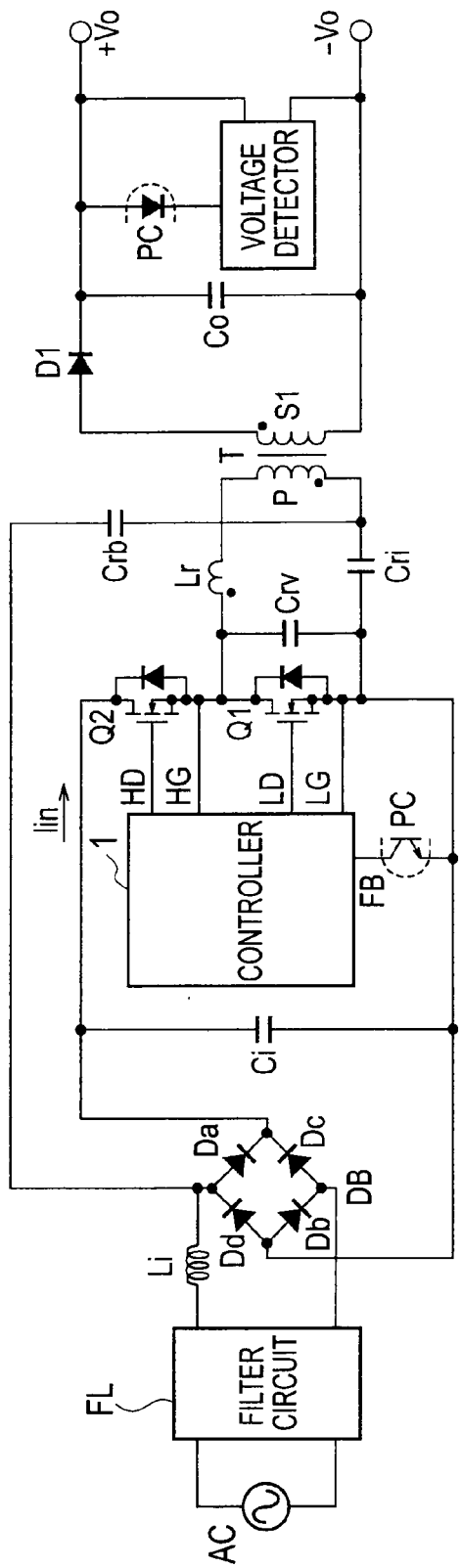
FIG. 26 is a circuit diagram illustrating a converter according to Embodiment 10 of the present invention.

FIG. 26 is a circuit diagram illustrating a converter according to Embodiment 10 of the present invention. Embodiment 10 differs from Embodiment 9 of FIG. 25 in that Embodiment 10 connects the second end of the feedback capacitor Crb between the reactor Li and the bridge rectifier DB.

The converter of Embodiment 10 operates like the converter of Embodiment 8 and provides effect similar to that provided by the converter of Embodiment 8

Embodiment 11

Figure 27:
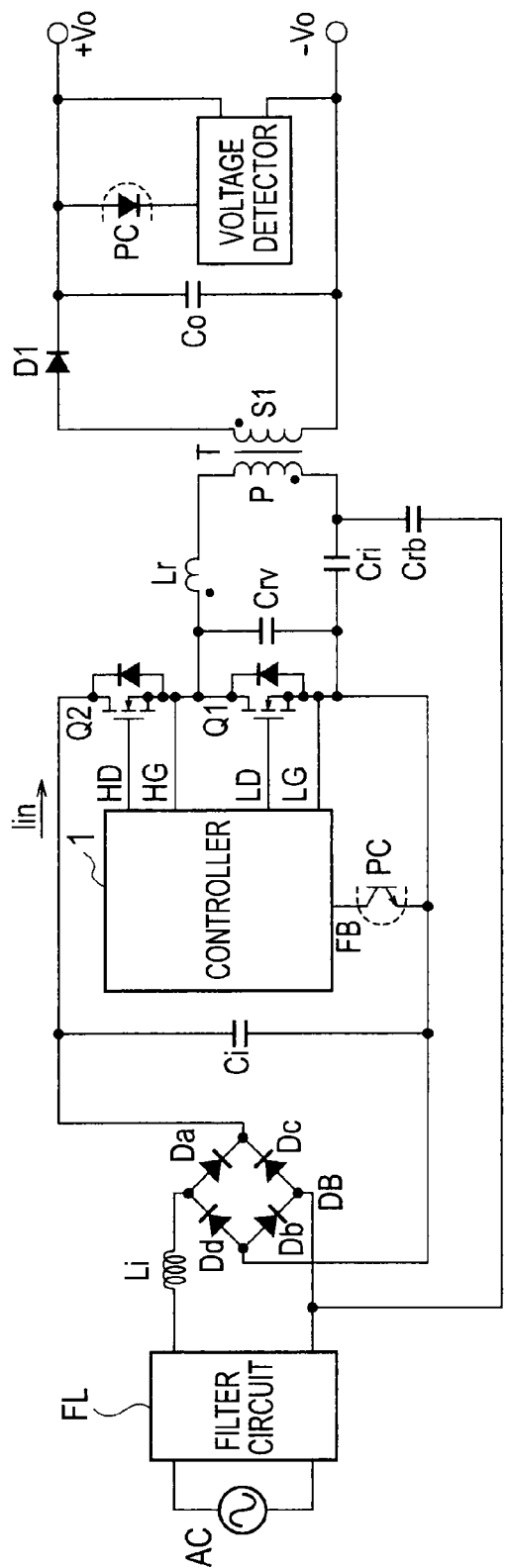
FIG. 27 is a circuit diagram illustrating a converter according to Embodiment 11 of the present invention.

FIG. 27 is a circuit diagram illustrating a converter according to Embodiment 11 of the present invention. Unlike the converter of Embodiment 9 illustrated in FIG. 25 that connects the second end of the feedback capacitor Crb between the first end of the AC power source AC and the reactor Li, Embodiment 11 illustrated in FIG. 27 connects the second end of the feedback capacitor Crb between a second end of the AC power source AC and a second end of the bridge rectifier DB.

The converter of Embodiment 11 operates like the converter of Embodiment 8 and provides effect similar to that provided by the converter of Embodiment 8

Embodiment 12

Figure 28:
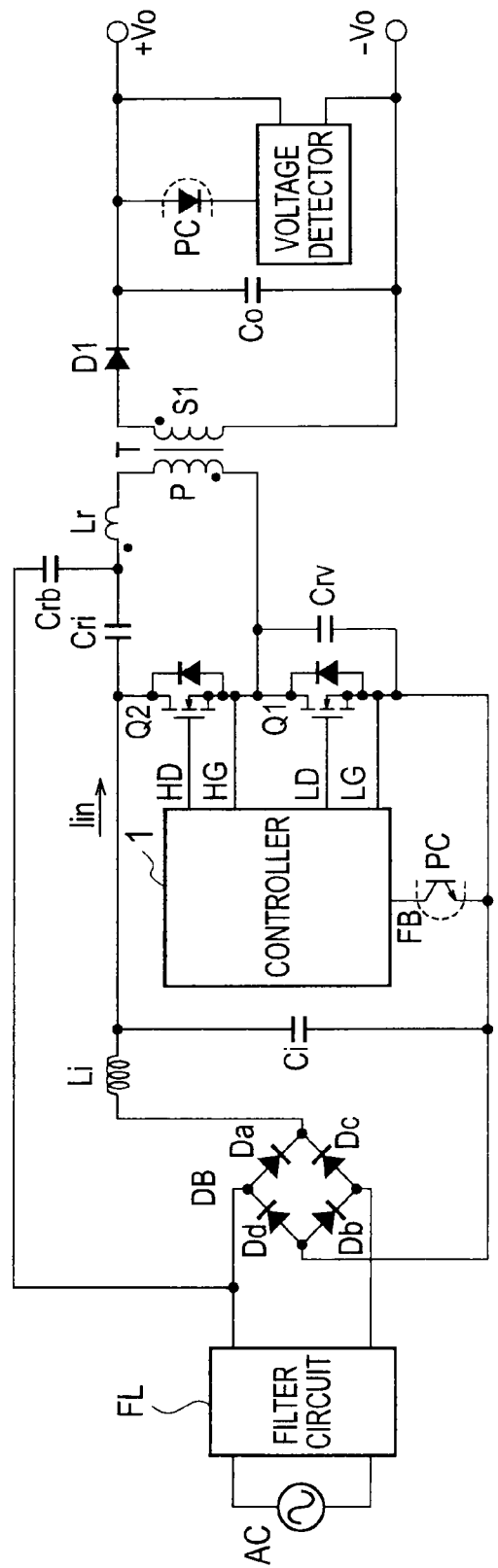
FIG. 28 is a circuit diagram illustrating a converter according to Embodiment 12 of the present invention.

FIG. 28 is a circuit diagram illustrating a converter according to Embodiment 12 of the present invention. Embodiment 12 differs from Embodiment 8 of FIG. 21 in that Embodiment 12 connects the series circuit including the current resonance capacitor Cri, the leakage inductor Lr, and the primary winding of the transformer T between the drain and source of the switching element Q2. The half-bridge converter employs the switching elements Q1 and Q2 that are up-down symmetrical, and therefore, the connecting position of the series circuit is changeable.

In this case, control signals for the switching elements Q1 and Q2 must be opposite to those of FIG. 21 depending on rectification polarities on the secondary side of the transformer T. Embodiment 12 provides effect similar to that provided by Embodiment 8.

According to Embodiment 12, the voltage resonance capacitor Crv may be connected to both ends of the switching element Q2 instead of those of the switching element Q1.

Embodiment 13

Figure 29:
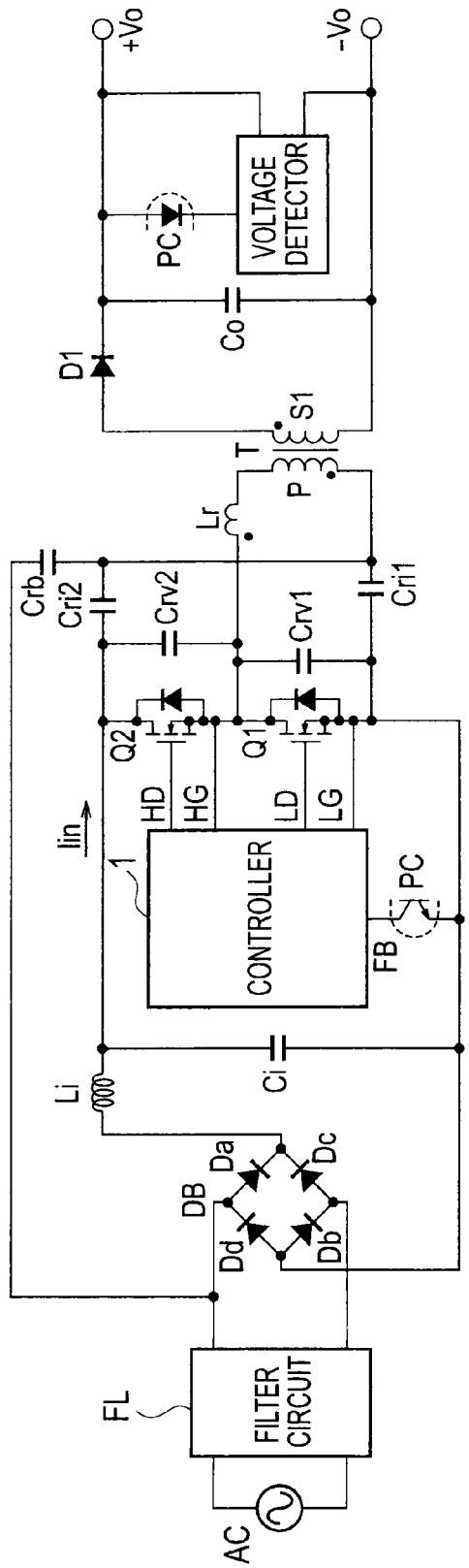
FIG. 29 is a circuit diagram illustrating a converter according to Embodiment 13 of the present invention.

FIG. 29 is a circuit diagram illustrating a converter according to Embodiment 13 of the present invention. Embodiment 13 differs from Embodiment 8 of FIG. 21 in that Embodiment 13 divides the current resonance capacitor Cri into current resonance capacitors Cri1 and Cri2 and connects a series circuit of the current resonance capacitors Cri1 and Cri2 in parallel with the input smoothing capacitor Ci.

Also, Embodiment 13 divides the voltage resonance capacitor Crv into voltage resonance capacitors Crv1 and Crv2 and connects the voltage resonance capacitors Crv1 and Crv2 in parallel with the switching elements Q1 and Q2, respectively.

Embodiment 13 provides effect similar to that provided by Embodiment 8.

Embodiment 14

Figure 30:
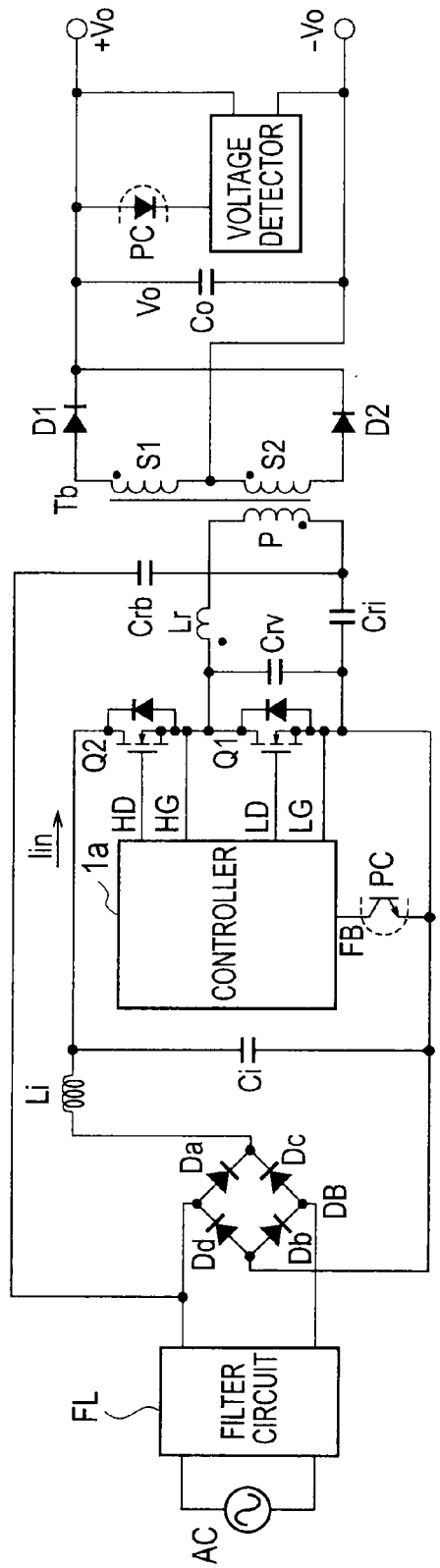
FIG. 30 is a circuit diagram illustrating a converter according to Embodiment 14 of the present invention.

FIG. 30 is a circuit diagram illustrating a converter according to Embodiment 14 of the present invention. Unlike the converter of Embodiment 8 illustrated in FIG. 21 that carries out half-wave rectification on the secondary side of the transformer T, Embodiment 14 illustrated in FIG. 30 carries out both-wave rectification on the secondary side of the transformer T. For this, Embodiment 14 provides the transformer T with first and second secondary windings S1 and S2. The secondary windings S1 and S2 are connected in series and employ a center tap configuration. In addition, Embodiment 14 employs diodes D1 and D2 serving as a both-wave rectifying circuit and connects the smoothing capacitor Co to the both-wave rectifying circuit.

Namely, the DC-DC converter of the present embodiment is a both-wave-rectifying current resonance converter. This converter employs a different output voltage controlling technique from the half-wave-rectifying current resonance converter of Embodiment 8 illustrated in FIG. 21. For this, the present embodiment employs the controller 1a illustrated in FIGS. 18 to 20. The details of the configuration and operation of the controller 1a have already been explained with reference to Embodiment 8, and therefore, will not be explained.

The converter according to the present embodiment illustrated in FIG. 30 employs the controller 1a to alternately turn on/off the switching elements Q1 and Q2 each with a fixed dead time and control the frequency of these switching elements. The present embodiment variably controls the switching frequency with respect to a change in an input voltage. This is carried out with the use of a fact that the frequency of a resonance current passed to the load is constant. By controlling the switching frequency of the switching elements Q1 and Q2, the present embodiment widens the ON width of the switching elements Q1 and Q2 to increase an excitation current, i.e., a circulating current, thereby adjusting the amplitude of the voltage of the current resonance capacitor Cri and control an output voltage.

FIG. 20 is a graph illustrating a relationship between switching frequency and output power. An error signal detected by the voltage detector 3 is transmitted as a current through the photocoupler PC to the terminal FB of the controller 1a. In the controller 1a, the oscillator OSC changes its frequency in response to the current to the terminal FB. Accordingly, the current resonance capacitor Cri generates an amplitude voltage with respect to a variation such as a load variation and an input voltage variation. The amplitude voltage is fed back through the feedback capacitor Crb to the input side, to charge the input smoothing capacitor Ci with a wide range of input voltages. Consequently, Embodiment 14 provides effect similar to that provided by Embodiment 8.

Embodiment 15

Figure 31:
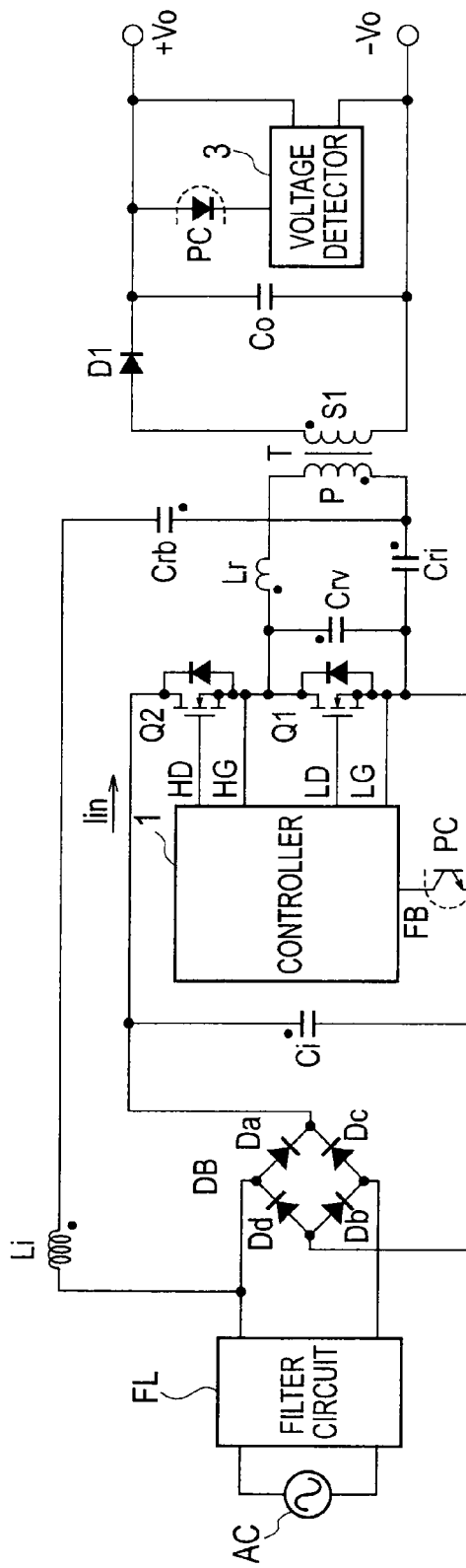
FIG. 31 is circuit diagram illustrating a converter according to Embodiment 15 of the present invention.

FIG. 31 is a circuit diagram illustrating a converter according to Embodiment 15 of the present invention. Unlike the converter of Embodiment 8 illustrated in FIG. 21 that connects the reactor Li between the bridge rectifier DB and the input smoothing capacitor Ci, Embodiment 15 illustrated in FIG. 31 connects a first end of the reactor Li to the second end of the feedback capacitor Crb and connects a second end of the reactor Li between the filter circuit FL and the bridge rectifier DB. The second end of the reactor Li is connected to the first end of the AC power source AC, if the filter circuit FL is omitted.

Figure 32:
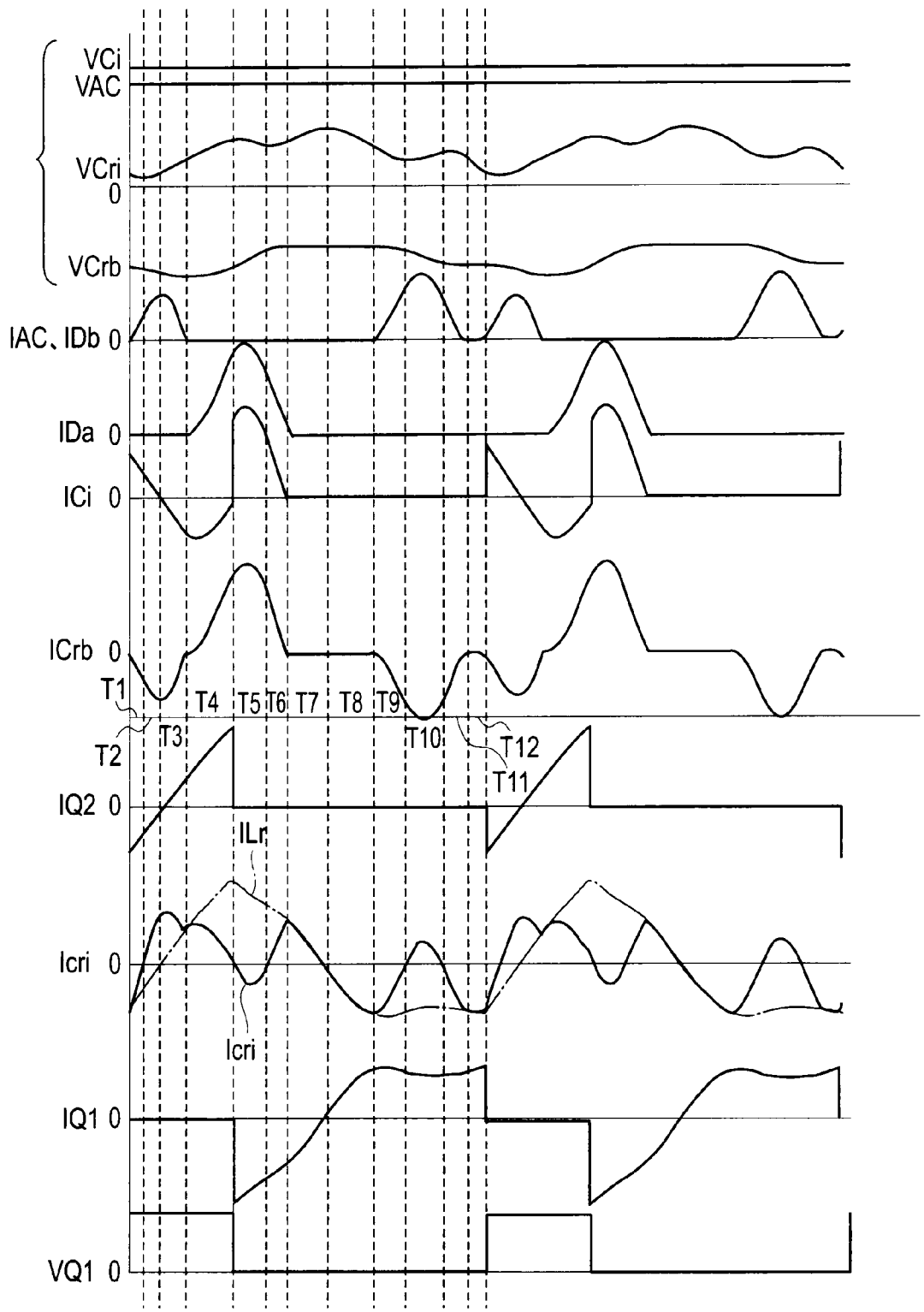
FIG. 32 is a view illustrating waveforms at different locations of the converter of FIG. 31 when an upper end of an AC power source AC of FIG. 31 is positive.

FIG. 32 illustrates waveforms at different locations of the converter of FIG. 31 when an upper end of the AC power source AC is positive. Voltage and current reference marks used in FIG. 32 are the same as those used in FIG. 22, and therefore, will not be explained again. Operation of each period will be explained by dividing the period into sub-periods T1 to T12. The feedback capacitor Crb is charged to an opposite polarity with respect to a polarity as depicted by a dot.

In the following explanation, explanation about a current on the secondary side of the transformer T that passes in the same timing manner of the related art is omitted. Also omitted is explanation about the current and quasi-voltage-resonance operation of the voltage resonance capacitor Crv.

In sub-period T1, the switching element Q1 is OFF and the switching element Q2 is ON. At this time, there are two current paths, i.e., a first path (I) extending along AC, FL, Li, Crb, P, Lr, Q2, Ci, Db, FL, and AC and a second path (II) (for in a counterclockwise manner) extending along Cri, P, Lr, Q2, Ci, and Cri. Through one of the current paths, the currents ILi, ICrb, ILr, IQ2, ICi, IDb, and Icri pass. As a result, the feedback capacitor Crb and input smoothing capacitor Ci are charged from the AC power source AC and the current resonance capacitor Cri is discharged.

In sub-period T2, the same state continues that the switching element Q1 is OFF and the switching element Q2 is ON. At this time, the currents ILi, ICrb, ILr, IQ2, ICi, and IDb pass through a path extending along AC, FL, Li, Crb, Cri, Db, FL, and AC and the currents ILi, ICrb, Icri, and IDb pass through the path extending along AC, FL, Li, Crb, Cri, Db, FL, and AC, to charge the feedback capacitor Crb, input smoothing capacitor Ci, and current resonance capacitor Cri from the AC power source AC.

In sub-period T3, the same state continues that the switching element Q1 is OFF and the switching element Q2 is ON. In this case, there are an interval (I) in which the currents ILi, ICrb, Icri, and IDb pass through the path extending along AC, FL, Li, Crb, Cri, Db, FL, and AC, to charge the feedback capacitor Crb and current resonance capacitor Cri from the AC power source AC and an interval (II) in which the currents IC1, IQ2, ILr, and Icri pass clockwise through a path extending along C1, Q2, Lr, P, Cri, and Ci, to discharge the input smoothing capacitor Ci and charge the current resonance capacitor. Cri.

In sub-period T4, the same state continues that the switching element Q1 is OFT and the switching element Q2 is ON. In this case, there are an interval (I) in which the currents ICrb, ILi, IDa, IQ2, and ILr pass through a path extending along Crb, Li, Da, Q2, Lr, P, and Crb, to discharge the feedback capacitor Crb and an interval (II) in which the currents IC1, IQ2, ILr, and Icri pass clockwise through the path extending along C1, Q2, Lr, P, Cri, and Ci, to discharge the input smoothing capacitor Ci and charge the current resonance capacitor Cri.

In sub-period T5, a sudden change occurs so that the switching element Q1 is ON and the switching element Q2 is OFF. In this case, there are an interval (I) in which the currents ICrb, ILi, IDa, IC1, IQ1, and ILr pass through a path extending along Crb, Li, Da, Ci, Q1, Lr, P, and Crb, to discharge the feedback capacitor Crb and an interval (II) in which the currents Icri, ILr, and IQ1 pass counterclockwise through a path extending along Cri, P, Lr, Q1, and Cri, to discharge the current resonance capacitor Cri.

In sub-period T6, the same state continues that the switching element Q1 is ON and the switching element Q2 is OFF. In this case, there are an interval (I) in which the currents ICrb, ILi, IDa, IC1, IQ1, and ILr pass through a path extending along Crb, Li, Da, C1, Q1, Lr, P, and Crb, to discharge the feedback capacitor Crb and charge the input smoothing capacitor Ci and an interval (II) in which the currents Icri, IQ1, and ILr pass clockwise through a path extending along P, Cri, Q1, Lr, and P, to charge the current resonance capacitor Cri.

In sub-period T7, the same state continues that the switching element Q1 is ON and the switching element Q2 is OFF. At this time, the currents Icri, IQ1, and ILr pass clockwise through the path extending along P, Cri, Q1, Lr, and P, to charge the current resonance capacitor Cri.

In sub-period T8, the same state continues that the switching element Q1 is ON and the switching element Q2 is OFF. At this time, the currents Icri, ILr, and IQ1 pass counterclockwise through the path extending along Cri, P, Lr, Q1, and Cri, to discharge the current resonance capacitor Cri.

In sub-period T9, the same state continues that the switching element Q1 is ON and the switching element Q2 is OFF. In this case, there are an interval (I) in which the currents ILi, ICrb, ILr, IQ1, and IDb pass through a path extending along AC, FL, Li, Crb, P, Lr, Q1, Db, FL, and AC, to charge the feedback capacitor Crb from the AC power source AC and an interval (II) in which the currents Icri, ILr, and IQ1 pass counterclockwise through the path extending along Cri, P, Lr, Q1, Cri, to discharge the current resonance capacitor Cri.

In sub-period T10, the same state continues that the switching element Q1 is ON and the switching element Q2 is OFF. In this case, there are an interval (I) in which the currents ILi, ICrb, ILr, IQ1, and IDb pass through the path extending along AC, FL, Li, Crb, P, Lr, Q1, Db, FL, and AC, to charge the feedback capacitor Crb from the AC power source AC and an interval (II) in which the currents ILi, ICrb, Icri, and IDb pass through a path extending along AC, FL, Li, Crb, Cri, Db, FL, and AC, to charge the current resonance capacitor Cri from the AC power source AC.

In sub-period T11, the same state continues that the switching element Q1 is ON and the switching element Q2 is OFF. In this case, there are an interval (I) in which the currents ILi, ICrb, ILr, IQ1, and IDb pass through the path extending along AC, FL, Li, Crb, P, Lr, Q1, Db, FL, and AC, to charge the feedback capacitor Crb from the AC power source AC and an interval (II) in which the currents Icri, ILr, and IQ1 pass counterclockwise through the path extending along Cri, P, Lr, Q1, and Cri, to discharge the current resonance capacitor Cri.

In sub-period T12, the same state continues that the switching element Q1 is ON and the switching element Q2 is OFF. At this time, the currents Icri, ILr, and IQ1 pass counterclockwise through the path extending along Cri, P, Lr, Q1, and Cri, to discharge the current resonance capacitor Cri.

In each of sub-periods T5 to T11, a current passes through the secondary side of the transformer T, to supply power to a load.

Figure 33:
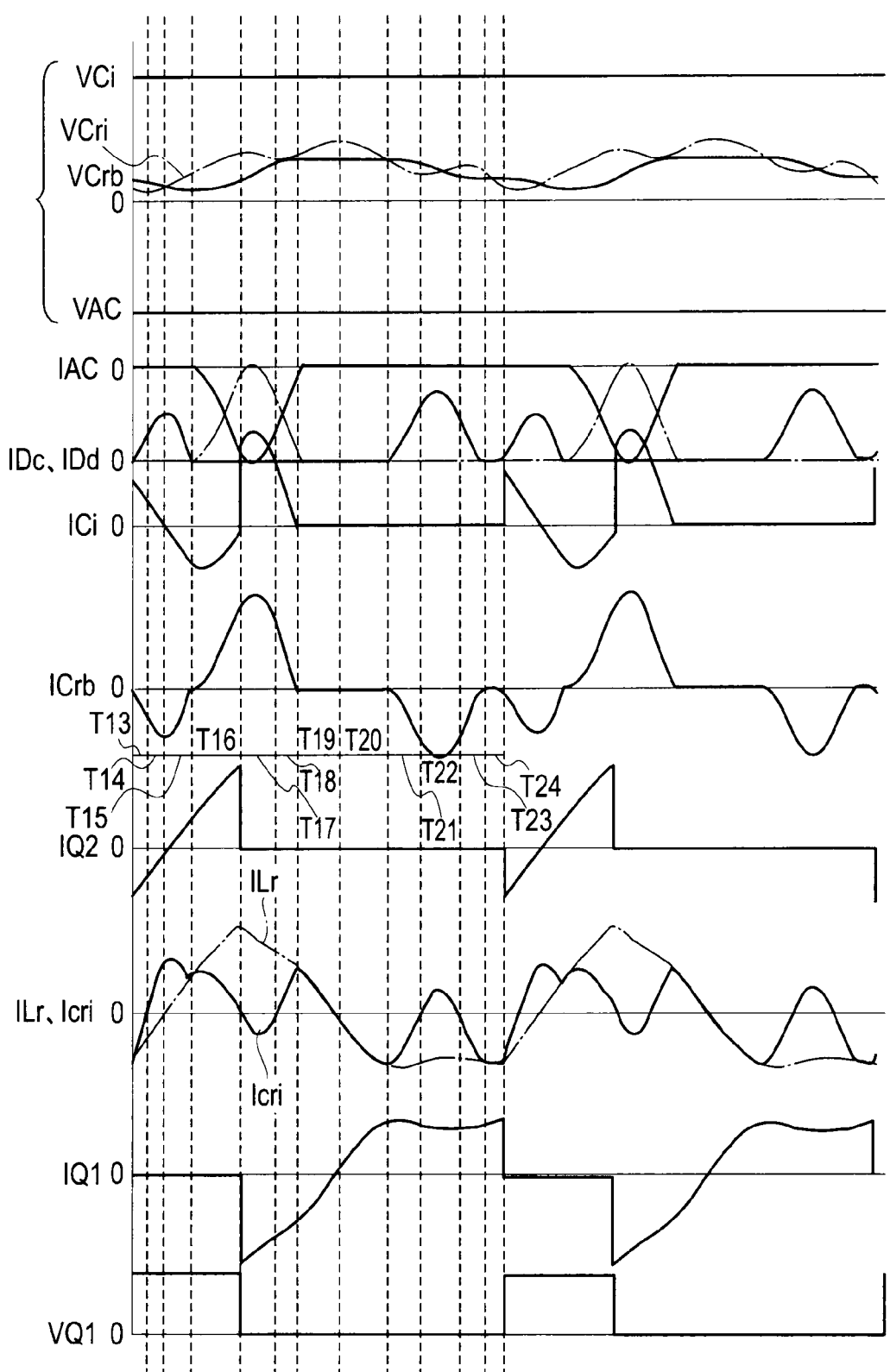
FIG. 33 is a view illustrating waveforms at the different locations of the converter of FIG. 31 when a lower end of the AC power source AC of FIG. 31 is positive.

FIG. 33 illustrates waveforms at the different locations of the converter of the present embodiment when a lower end of the AC power source AC of FIG. 31 is positive. Operation of each period will be explained by dividing the period into sub-periods T13 to T24. The feedback capacitor Crb is charged to a positive polarity with respect to a polarity indicated with a dot.

In the following explanation, explanation about a current on the secondary side of the transformer T that passes in the same timing manner of the related art is omitted. Also omitted is explanation about the current and quasi-voltage-resonance operation of the voltage resonance capacitor Crv.

In sub-period T13, the switching element Q1 is OFF and the switching element Q2 is ON. In this case, the currents ICrb, ILr, IQ2, ICi, IDd, and ILi pass through a path extending along Crb, P, Lr, Q2, Ci, Dd, Li, and Crb and the currents Icri, ILr, IQ2, and ICi pass through the path extending along Cri, P, Lr, Q2, Ci, and Cri, to discharge the feedback capacitor Crb and current resonance capacitor Cri and charge the input smoothing capacitor Ci.

In sub-period T14, the same state continues that the switching element Q1 is OFF and the switching element Q2 is ON. In this case, the currents ICrb, ILr, IQ2, ICi, IDd, and ILi pass through the path extending along Crb, P, Lr, Q2, Dd, Li, and Crb and the currents ICrb, Icri, IDd, and ILi pass clockwise through a path extending along Crb, Cri, Dd, Li, and Crb, to discharge the feedback capacitor Crb and charge the current resonance capacitor Cri and input smoothing capacitor Ci.

In sub-period T15, the same state continues that the switching element Q1 is OFF and the switching element Q2 is ON. In this case, the currents ICrb, Icri, IDd, and ILi pass clockwise through the path extending along Crb, Cri, Dd, Li, and Crb and the currents IC1, IQ2, ILr, and Icri pass clockwise through the path extending along C1, Q2, Lr, P, Cri, and Ci, to discharge the feedback capacitor Crb and input smoothing capacitor Ci and charge the current resonance capacitor Cri.

In sub-period T16, the same state continues that the switching element Q1 is OFF and the switching element Q2 is ON. In this case, there are an interval (I) in which the currents IDc, IQ2, ILr, ICrb, and ILi pass through a path extending along AC, FL, Dc, Q2, Lr, P, Crb, Li, FL, and AC, to charge the feedback capacitor Crb from the AC power source AC and an interval (II) in which the currents IC1, IQ2, ILr, and Icri pass clockwise through the path extending along C1, Q2, Lr, P, Cri, and Ci, to discharge the input smoothing capacitor Ci and charge the current resonance capacitor Cri.

In sub-period T17, a sudden change occurs so that the switching element Q1 is ON and the switching element Q2 is OFF. In this case there are an interval (I) in which the currents IDc, IC1, IQ1, ILr, ICrb, and ILi pass through a path extending along AC, FL, Dc, Ci, Q1, Lr, P, Crb, Li, FL, and AC, to charge the input smoothing capacitor Ci and feedback capacitor Crb and an interval (II) in which the currents Icri, ILr, and IQ1 pass counterclockwise through the path extending along Cri, P, Lr, Q1, and Cri, to discharge the current resonance capacitor Cri.

In sub-period T18, the same state continues that the switching element Q1 is ON and the switching element Q2 is OFF. In this case, there are an interval (I) in which the currents IDc, IC1, IQ1, ILr, ICrb, and ILi pass through the path extending along AC, FL, Dc, Ci, Q1, Lr, P, Crb, Li, FL, and AC, to charge the input smoothing capacitor Ci and feedback capacitor Crb and an interval (II) in which the currents Icri, IQ1, and ILr pass clockwise through the path extending along P, Cri, Q1, Lr, and P, to charge the current resonance capacitor Cri.

In sub-period T19, the same state continues that the switching element Q1 is ON and the switching element Q2 is OFF. At this time, the currents Icri, IQ1, and ILr pass clockwise through the path extending along P, Cri, Q1, Lr, and P, to charge the current resonance capacitor Cri.

In sub-period T20, the same state continues that the switching element Q1 is ON and the switching element Q2 is OFF. At this time, the currents Icri, ILr, and IQ1 pass counterclockwise through the path extending along Cri, P, Lr, Q1, and Cri, to discharge the current resonance capacitor Cri.

In sub-period T21, the same state continues that the switching element Q1 is ON and the switching element Q2 is OFF. In this case, there are an interval (I) in which the currents ICrb, ILr, IQ1, IDd, and ILi pass through a path extending along Crb, P, Lr, Q1, Dd, Li, and Crb, to discharge the feedback capacitor Crb and an interval (II) in which the currents Icri, ILr, and IQ1 pass counterclockwise through the path extending along Cri, P, Lr, Q1, and Cri, to discharge the current resonance capacitor Cri.

In sub-period T22, the same state continues that the switching element Q1 is ON and the switching element Q2 is OFT. In this case, there are an interval (I) in which the currents ICrb, ILr, IQ1, IDd, and ILi pass through the path extending along Crb, P, Lr, Q1, Dd, Li, and Crb, to discharge the feedback capacitor Crb and an interval (II) in which the currents Icri, IQ1, and ILr pass through the path extending along P, Cri, Q1, Lr, and P, to charge the current resonance capacitor Cri.

In sub-period T23, the same state continues that the switching element Q1 is ON and the switching element Q2 is OFF. In this case, there are an interval (I) in which the currents ICrb, ILr, IQ1, IDd, and ILi pass through the path extending along Crb, P, Lr, Q1, Dd, Li, and Crb, to discharge the feedback capacitor Crb and an interval (II) in which the currents Icri, ILr, and IQ1 pass counterclockwise through the path extending along Cri, P, Lr, Q1, and Cri, to discharge the current resonance capacitor Cri.

In sub-period T24, the same state continues that the switching element Q1 is ON and the switching element Q2 is OFF. At this time, the currents Icri, ILr, and IQ1 pass counterclockwise through the path extending along Cri, P, Lr, Q1, and Cri, to discharge the current resonance capacitor Cri.

In each of sub-periods T17 to T23, a current passes through the secondary side of the transformer T, to supply power to the load.

Figure 34:
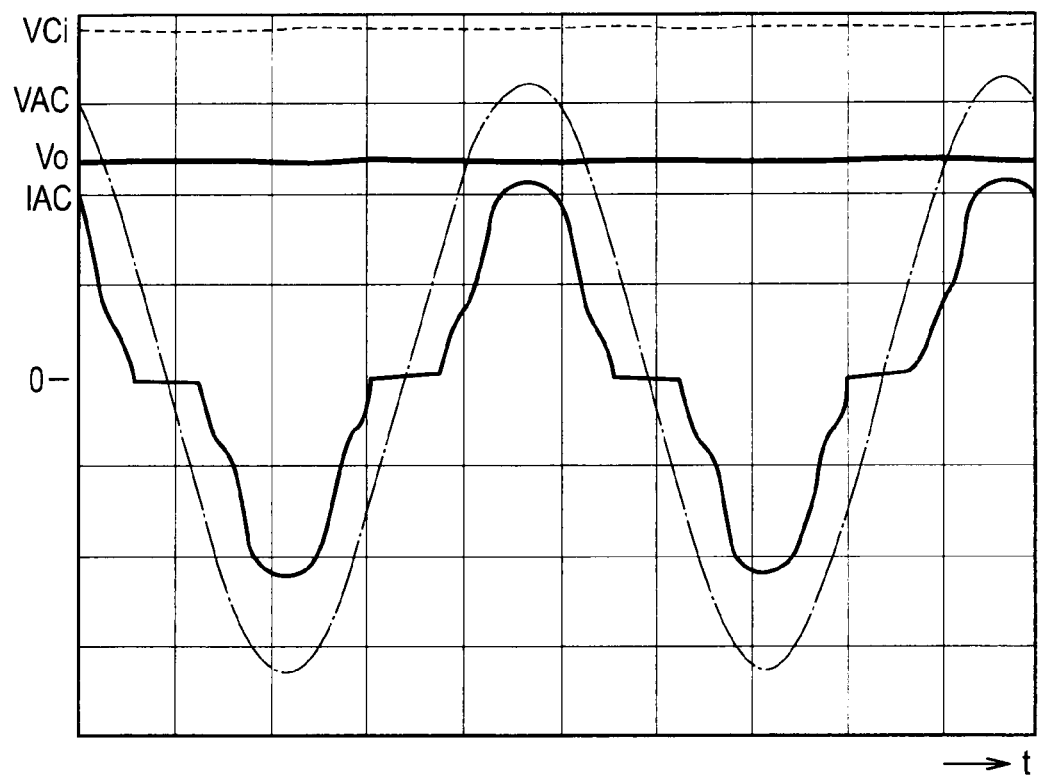
FIG. 34 is a view illustrating waveforms at different locations of the converter of FIG. 31.

In this way, the converter according to the present embodiment connects the reactor Li and feedback capacitor Crb in series, to form new current paths. Even if the voltage of the AC power source AC is lower than the voltage of the input smoothing capacitor Ci, the input smoothing capacitor Ci is charged to pass an AC power source current with respect to a wide range of AC power source voltages Accordingly, as illustrated in FIG. 34, Embodiment 15 is capable of providing an AC power source current IAC whose waveform approximately follows the waveform of an AC power source voltage VAC, thereby correcting a power factor and reducing harmonic currents.

The converter according to any one of Embodiments 8 to 15 is a current resonance converter having a power factor correcting function that is realized only by adding a small number of parts. This converter produces little noise, is efficient, has the power factor correcting function, and therefore, is applicable to realize a power source apparatus conforming to harmonics regulations at low cost.

The current resonance converter according to any one of Embodiments 8 to 15 is easy to adjust step-up energy by properly setting constants for elements arranged in the converter, and therefore, is capable of realizing the power factor correcting function with a required minimum of step-up energy. The power factor correcting function provided by the current resonance converter of any one of Embodiments 8 to 15 is efficient and is achievable without deteriorating the resonance function.

The present invention is not limited to the converters explained with reference to Embodiments 1 to 15. The converter of any one of Embodiments 1 to 6, 8 to 13, and 15 arranges the half-wave rectifying circuit and smoothing capacitor on the secondary side of the transformer T and the converter of any one of Embodiments 7 and 14 arranges the both-wave rectifying circuit and smoothing capacitor on the secondary side of the transformer T. Instead, a full-wave rectifying circuit and a smoothing capacitor connected to the full-wave rectifying circuit may be arranged on the secondary side of the transformer T.

In summary, the converter according to the present invention is capable of providing a power factor correcting function and reducing harmonic currents, switching loss, and noise at low cost.

The present invention is applicable to converters such as AC-DC converters and DC-DC converters.

This application claims benefit of priority under 35USC §119 to Japanese Patent Applications No. 2010-178846, filed on Aug. 9, 2010 and No. 2010-178851, filed on Aug. 9, 2010, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A converter comprising:
a rectifying circuit configured to rectify an AC voltage supplied from an AC power source into a rectified voltage;
an input smoothing capacitor configured to smooth the rectified voltage;
a first series circuit connected to both ends of the input smoothing capacitor and including a first switching element and a second switching element;
a second series circuit including a primary winding of a transformer and a first capacitor and connected to a connection point of the first and second switching elements and a first end of the input smoothing capacitor;
a controller configured to alternately turn on/off the first and second switching elements;
a rectifying-smoothing circuit configured to rectify and smooth a high-frequency voltage generated at a secondary winding of the transformer into a DC output voltage; and
a second capacitor connected between a connection point of the primary winding of the transformer and the first capacitor and a first end of the AC power source, charged by the AC power source or the input smoothing capacitor, and upon the charged voltage of the second capacitor exceeding the AC voltage of the AC power source, the second capacitor is discharged.

2. A converter comprising:
a rectifying circuit configured to rectify an AC voltage supplied from an AC power source into a rectified voltage;
an input smoothing capacitor configured to smooth the rectified voltage;
a rectifier connected between the rectifying circuit and the input smoothing capacitor;
a first series circuit connected to both ends of the input smoothing capacitor and including a first switching element and a second switching element;
a second series circuit including a primary winding of a transformer and a first capacitor and connected to a connection point of the first and second switching elements and a first end of the input smoothing capacitor;
a controller configured to alternately turn on/off the first and second switching elements;
a rectifying-smoothing circuit configured to rectify and smooth a high-frequency voltage generated at a secondary winding of the transformer into a DC output voltage; and
a second capacitor connected between a connection point of the primary winding of the transformer and the first capacitor and a connection point of the rectifying circuit and rectifier, charged by the AC power source or the input smoothing capacitor, and upon the charged voltage of the second capacitor exceeding the AC voltage of the AC power source, the second capacitor is discharged.

3. A converter comprising:
a rectifying circuit configured to rectify an AC voltage supplied from an AC power source into a rectified voltage;
an input smoothing capacitor configured to smooth the rectified voltage;
a reactor connected to one selected from a connection between an output end of the rectifying circuit and the input smoothing capacitor and a connection between the AC power source and the rectifying circuit;
a first series circuit connected to both ends of the input smoothing capacitor and including a first switching element and a second switching element;
a second series circuit including a primary winding of a transformer and a first capacitor, the second series circuit being connected to a connection point of the first and second switching elements and a first end of the input smoothing capacitor;

a controller configured to alternately turn on/off the first and second switching elements;

a rectifying-smoothing circuit configured to rectify and smooth a high-frequency voltage generated at a secondary winding of the transformer into a DC output voltage; and a second capacitor connected between a connection point of the primary winding of the transformer and the first capacitor and a first end of the AC power source, charged by the AC power source or the input smoothing capacitor, and upon the charged voltage of the second capacitor exceeding the AC voltage of the AC power source, the second capacitor is discharged.

4. The converter of claim 3, wherein:

the reactor is connected between the AC power source and the rectifying circuit;

a first end of the second capacitor is connected between the reactor and the rectifying circuit; and the first end of the second capacitor is connected through the reactor to the first end of the AC power source.

5. The converter of claim 3, wherein:

the reactor is connected between the first end of the AC power source and a first end of the rectifying circuit; and a first end of the second capacitor is connected between a second end of the AC power source and a second end of the rectifying circuit.

6. A converter comprising:

a rectifying circuit configured to rectify an AC voltage supplied from an AC power source into a rectified voltage;

an input smoothing capacitor configured to smooth the rectified voltage;

a first series circuit connected to both ends of the input smoothing capacitor and including a first switching element and a second switching element;

a second series circuit connected to a connection point of the first and second switching elements and a first end of the input smoothing capacitor and including a primary winding of a transformer and a first capacitor;

a controller configured to alternately turn on/off the first and second switching elements;

a rectifying-smoothing circuit configured to rectify and smooth a high-frequency voltage generated by a secondary winding of the transformer into a DC output voltage; and a third series circuit including a second capacitor and a reactor, the third series circuit being connected between a connection point of the primary winding of the transformer and the first capacitor and a first end of the AC power source, charged by the AC power source or the input smoothing capacitor, and upon the charged voltage of the second capacitor exceeding the AC voltage of the AC power source, the second capacitor is discharged.

* * * * *